(12) United States Patent
Momozono et al.

(10) Patent No.: US 6,927,773 B2
(45) Date of Patent: Aug. 9, 2005

(54) FONT PROCESSING DEVICE, TERMINAL DEVICE, FONT PROCESSING METHOD, AND FONT PROCESSING PROGRAM

(75) Inventors: Yukinobu Momozono, Kagashima (JP); Takashi Kurumisawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 10/648,432

(22) Filed: Aug. 27, 2003

(65) Prior Publication Data

US 2004/0090440 A1 May 13, 2004

(30) Foreign Application Priority Data

Aug. 30, 2002 (JP) ........................................ 2002-255257
Aug. 30, 2002 (JP) ........................................ 2002-255258

(51) Int. Cl.[7] .............................................. G06T 11/00
(52) U.S. Cl. ...................... 345/467; 345/471; 345/472; 345/472.1; 345/472.2
(58) Field of Search .................................. 345/471, 472, 345/472.1, 472.2, 467

(56) References Cited

U.S. PATENT DOCUMENTS

| | | | | |
|---|---|---|---|---|
| 4,959,801 A | * | 9/1990 | Apley et al. ................. 345/469 |
| 5,502,804 A | * | 3/1996 | Butterfield et al. .......... 715/502 |
| 5,519,824 A | * | 5/1996 | Lizzi ........................... 345/170 |
| 5,708,762 A | * | 1/1998 | Chiba et al. ................. 358/1.8 |
| 5,793,902 A | * | 8/1998 | Watanabe et al. ........... 382/298 |
| 2004/0183802 A1 | * | 9/2004 | Chan ........................... 345/467 |

* cited by examiner

Primary Examiner—Richard Hjerpe
Assistant Examiner—Blake Betz
(74) Attorney, Agent, or Firm—Oliff & Berridge, PLC

(57) ABSTRACT

The invention provides a font processing device. In font enlargement, a target font to be enlarged or reduced is divided into columns or rows, and a cost is calculated based on the pixel pattern formation for each column and row. In enlargement processing, a cost represents a line segment volume, and a column or a row that has low-cost, that is, has a pixel array close to a line segment, is difficult to be enlarged. Further, in reduction processing, a cost represents a degree of likeness to an adjacent column or row, and a column or a row that has a similar pixel pattern is reduced with priority. In practice, the column or row for the target font is decided based on the pixel formation of the target font for enlargement or reduction so that natural enlargement/reduction can be obtained. In addition, font modification is executed by using enlargement and reduction of the font.

47 Claims, 17 Drawing Sheets

S21: COUNT FONT FORMATION PIXEL (■)

S22: ADD ADJACENT PIXEL PORTION
(ADD +2 TO CONTINUOUS ■)

S14: PUT ORDER FROM CENTER OF CHARACTER TO EDGE IN THE
ASCENDING ORDER OF COST

S16: ENLARGEMENT PROCESSING

S52: CALCULATING XOR WITH ADJACENT ROW, COUNT THE NUMBER WHEN XOR IS 1

S54: PUT FROM CENTER OF CHARACTER TO EDGE IN THE ASCENDING ORDER OF COST

S56: REDUCTION PROCESSING

IN LEFT EXAMPLE, 3 DOT LENGTHWISE REDUCTION IS DONE (14 → 11)

FONT PROCESSING DEVICE, TERMINAL DEVICE, FONT PROCESSING METHOD, AND FONT PROCESSING PROGRAM

BACKGROUND OF THE INVENTION

1. Field of Invention

The present invention relates to processes of enlarging, reducing, and modifying bitmap fonts.

2. Description of Related Art

Bitmap fonts are used for displaying characters and so on in devices such as cellular phones or Personal Digital Assistant (PDAs). Bitmap fonts display characters or symbols, by means of previously prepared pixel array patterns. In contrast to outline fonts, which display characters or symbols, by a set of vector data, bitmap fonts have a small data volume per character, owing to their simple pixel array patterns. For this reason, bitmap fonts are used in cellular phones or PDAs where the number of pixels of the display area is relatively small.

In the case of displaying characters or symbols on a display device, it is sometimes necessary to enlarge or reduce the characters. In bitmap fonts used for cellular phones, PDAs, and the like, the size of the characters is small and there are also many cases where characters are displayed with a thickness of one pixel. In that case, when enlarging bitmap fonts by the method of carrying out simple coordinate transformation based on the aspect ratio between sizes of an original character and an enlarged character thereof, there may be unnatural-looking portions, in terms of thickness, in the enlarged character. Further, when reducing such small bitmap fonts by the above-described simple coordinate transformation, there might be a line having an unnatural thickness due to distortion in the reduced character, or a case where the reduced character does not correspond with the original character owing to unsuitable connection between portions thereof.

Further, in case of displaying characters or symbols on a display device, there are instances where it is required to modify the character or the symbol. For example, it may be necessary to display a font that has the equal standard aspect ratio by modifying the widthwise font and lengthwise. This requirement may depend on the user's preference that lengthwise or widthwise modified characters can be easily seen, and so on. That requirement may occur from mainly the processing on a display device, depending on the configuration of the display area of the display device or the formation of the image to be displayed. For instance, since lengthwise displayed characters can easily be seen on a lengthwise-type display area or since images are displayed together with composition in the display area, the configuration of the characters may be modified and displayed in relation to the display size or the display position of the image.

SUMMARY OF THE INVENTION

In consideration of the above-described requirement, an object of the present invention is to naturally enlarge/reduce and modify a small bitmap font which is used in a cellular phone, a PDA, or the like.

In an aspect of the present invention, a font processing device can include a data acquiring device for acquiring font data of a bitmap font, a lengthwise analyzing device for analyzing the pixel formation of the font data lengthwise, a widthwise enlargement/reduction device for enlarging or reducing the font data widthwise based on the lengthwise analysis result, a widthwise analyzing device for analyzing the pixel formation of the font data widthwise, and a lengthwise enlargement/reduction device for enlarging or reducing the font data lengthwise based on the widthwise analysis result.

In the same aspect, also, a method of processing font can include the steps of acquiring font data of a bitmap font, analyzing the pixel formation of the font data lengthwise, enlarging or reducing the font data widthwise based on the lengthwise analysis result, analyzing the pixel formation of the font data widthwise, enlarging or reducing the font data lengthwise based on the widthwise analysis result.

The font processing device or method as described above, enlarges or reduces bitmap font with a desired enlargement ratio or reduction ratio. First, font data of bitmap font that is target for enlargement or reduction is acquired. Then, the font data is lengthwise analyzed, and the font data is enlarged or reduced widthwise based on the analysis result. In the same manner, the font data of the bitmap font is widthwise analyzed, and the font data is enlarged or reduced lengthwise based on the analysis result. Owing to this, suitable enlargement/reduction processing is executed lengthwise and widthwise, respectively, in order to be corresponded with pixel formation of the font data that becomes target of enlargement/reduction, and thereby to prevent processed font data from being in unnatural state.

In one aspect of the font processing device, the lengthwise analyzing device can include a dividing device for dividing the font data into a plurality of columns and a calculating device for calculating, for each column, a cost that represents pixel formation features, and the lengthwise enlargement/reduction device executes pixel enlargement or reduction for a desired number of columns in the ascending order of column cost or descending order of column cost.

In this font processing device, a cost is evaluated from column direction (lengthwise) pixel formation of pixels forming the font data, and then, enlargement/reduction processing is executed based on the cost. Thus, pixel formation analysis can be executed by simple cost calculation to thereby enable speedy process.

In another aspect of the font processing device, the widthwise analyzing device can include as dividing device for dividing the font data into a plurality of rows and a calculating device for calculating, for each row, a cost that represents pixel formation features, and the lengthwise enlargement/reduction device executes pixel enlargement or reduction for a desired number of rows in the ascending order of row cost or descending order of row cost.

In this font processing device, a cost is evaluated from column direction (lengthwise) pixel formation of pixels forming the font data, and then, enlargement/reduction processing is executed based on the cost. Thus, pixel formation analysis can be executed by simple cost calculation to thereby enable speedy process.

In another aspect of the present invention, a font processing device can include a data acquiring device for acquiring font data of a bitmap font, widthwise enlargement processing device for enlarging the font data widthwise, and a lengthwise enlargement processing device for enlarging the font data lengthwise. The widthwise enlargement processing device can include a dividing device for dividing the font data into a plurality of columns, a cost calculating device for calculating a cost that represents a line segment volume of a pixel formation, for each column, and an enlarging device for executing widthwise pixel enlargement for a desired number of columns in the descending or ascending order of column cost, and the lengthwise enlargement processing device can include a dividing device for dividing the font data into a plurality of rows, cost calculating device for calculating a cost that represents a line segment volume of the pixel formation, for each row, and an enlarging device for executing lengthwise pixel enlargement for a desired number of rows in the ascending order of row cost or descending order of row cost.

In the same aspect, a method of processing a font can include the steps of acquiring font data of a bitmap font, enlarging the font data widthwise, and enlarging the font data lengthwise. The step of enlarging the font data widthwise can include the steps of dividing the font data into a plurality of columns, calculating a cost that represents a line segment volume of a pixel formation, for each column, and executing widthwise pixel enlargement for a desired number of columns in the descending or ascending order of column cost, and the step of enlarging the font data lengthwise comprises the steps of dividing the font data into a plurality of rows, calculating a cost that represents a line segment volume of the pixel formation, for each row, and executing lengthwise pixel enlargement for a desired number of rows in the ascending order of row cost or descending order of row cost.

In the above-described font processing device or method, the font data is divided into a plurality of columns, and then, a cost is calculated for each column. In this point, a cost represents a line segment volume of pixel, that is, an index indicating whether pixel forming the column is close to simple point, a set of points, or a line segment. Then, column is enlarged widthwise in the descending or ascending order of cost.

Thereby, the column having pixel formation closer to a point or a set of points has priority for enlargement over the column having pixel formation closer to a line segment so that the latter is difficult to be enlarged. Thus, breaking down of character balance as a whole due to excessive enlargement of line segment forming a character is disappeared so that natural enlargement can be obtained.

In the same manner, the font data is divided into a plurality of rows, and then, a cost is calculated for each row. In this point, a cost represent a line segment volume of pixel, and rows are enlarged lengthwise in the descending or ascending order of cost. Thus, the row having pixel formation closer to a point or a set of points has priority for enlargement over the row having pixel formation closer to a line segment so that the latter is difficult to be enlarged to thereby enable natural enlargement.

In an aspect of the font processing device, the desired number depends on the number of pixels lengthwise and widthwise, and on an enlargement ratio of the font data. That is, corresponding to an enlargement ratio of the font, it is decided what number of pixels is to be increased for lengthwise and widthwise pixels forming the font, and then, the font is enlarged to increase the lengthwise and widthwise pixels forming the font data to a degree of the number.

In another aspect of the font processing device, the cost calculating device can include a calculating device for calculating, as the cost, the number of pixels forming the column or the row for each column or each row, and an adding device for adding the number of pixels having adjacent pixels in the column or row to the cost.

In yet another aspect of the font processing device, the cost calculating device can include a calculating device for calculating the number of pixels forming the column or the row for each column or each row, and adding and an calculating device for adding the number of pixels having adjacent pixels in the column or row to the number of pixels forming the column or the row, and calculating an inverse number of the added result as a cost.

In these aspects, since the cost calculating device calculates a cost by simple operation, font enlargement processing can be speedily executed through simple configuration.

In still yet another aspect of the font processing device, the font data can include processing order information that represents the order of lengthwise enlargement processing and widthwise enlargement processing to be executed in enlargement processing of the font data, and further can include an order controlling device for controlling the order of the lengthwise enlargement processing and the widthwise enlargement processing based on the processing order information.

According to this aspect, for each target font to be enlarged, it is decided in advance which of lengthwise enlargement processing and widthwise enlargement processing is early executed in order to be pertinent to natural enlargement font, and then, the processing order information representing the order is included in the font data. Thus, the font processing device is capable of obtaining a natural enlargement font by deciding the execution order of lengthwise enlargement and widthwise enlargement with reference to the processing order information.

In yet another aspect of the present invention, a font processing device can include a data acquiring device for acquiring font data of a bitmap font, a widthwise reduction processing device for reducing the font data widthwise, and a lengthwise reduction processing device for reducing the font data lengthwise. The widthwise reduction processing device can include a dividing device for dividing the font data into a plurality of columns, a cost calculating device for calculating a cost that represents a degree of likeness to a pixel formation in an adjacent column, for each column, and a reducing device for executing widthwise pixel reduction for a desired number of columns in the descending or ascending order of column cost, and the lengthwise reduction processing device can include a dividing device for dividing the font data into a plurality of rows, a cost calculating device for calculating a cost that represents a degree of likeness to a pixel formation in an adjacent row, for each row, and a reducing device for executing lengthwise pixel reduction for a desired number of rows in the ascending order of row cost or descending order of row cost.

In the same aspect, a method of processing a font can include the steps of acquiring font data of a bitmap font, reducing the font data widthwise, and reducing the font data lengthwise. The step of reducing the font data widthwise can include the steps of dividing the font data into a plurality of columns, calculating a cost that represents a degree of likeness to a pixel formation in an adjacent column, for each column, and executing widthwise pixel reduction for a desired number of columns in the descending or ascending order of column cost. The step of reducing the font data lengthwise can include the steps of dividing the font data into a plurality of rows, calculating a cost that represents a degree of likeness to a pixel formation in an adjacent column, for each row, and executing lengthwise pixel reduction for a desired number of rows in the ascending order of row cost or descending order of row cost.

In the above-described font processing device or method, the font data can be divided into a plurality of columns, and then, a cost is calculated for each column. In this point, a cost represents a degree of likeness to pixel formation of an adjacent column. Then, column is reduced widthwise in the descending or ascending order of cost. Thereby, a portion that is adjacent to the column having similar pixel formation is previously reduced. Thus, breaking down of character balance as a whole is disappeared so that natural reduction can be obtained.

In the same manner, the font data can be divided into a plurality of rows, and then, a cost is calculated for each row. In this point, a cost represents a degree of likeness to a pixel formation in an adjacent row, and rows are reduced lengthwise in the descending or ascending order of cost. Thereby, a portion that is adjacent to the row having similar pixel formation is previously reduced. Thus, breaking down of character balance as a whole is disappeared so that natural reduction can be obtained.

In an aspect of the font processing device, the desired number depends on the number of lengthwise and widthwise pixels, and on the reduction ratio of the font data. That is, corresponding to the reduction ratio of the font, it is decided what number of pixels is to be decreased for lengthwise and widthwise pixels forming the font, and then, the font is reduced to decrease the lengthwise and widthwise pixels forming the font data to a degree of the number.

In yet another aspect of the font processing device, the cost calculating device calculates costs for each column and each row based on the exclusive-OR of pixel formation of the column or the row and each row and the pixel formation of a column or a row adjacent to the column or the row. In these aspects, since the cost calculating device calculates the cost by simple addition process, font enlargement processing can be speedily executed through simple configuration.

In still yet another aspect of the font processing device, the font data can include processing order information that represents the order of lengthwise reduction processing and widthwise reduction processing to be executed in reduction processing of the font data, and further includes an order controlling device for controlling the execution order of lengthwise reduction processing and widthwise reduction processing based on the processing order information.

According to this aspect, for each target font to be reduced, it is decided in advance which of lengthwise reduction processing and widthwise reduction processing is early executed in order to be pertinent to natural reduction font, and the processing order information representing the order is included in the font data. Thus, the font processing device is capable of obtaining a natural reduction font by deciding execution orders of lengthwise reduction and widthwise reduction with reference to the processing order information.

In a still yet another aspect of the present invention, a terminal device can include the font processing device, a memory for storing the font data generated by the font processing device, and a display part for displaying the font data generated by the font processing device. The terminal device, for example, can be a portable terminal device such as cellular phones, PDAs, or the like. In the font processing device according to the present invention, since enlargement or reduction of the font can be easily executed by a simple operation, natural font enlargement/reduction can be executed in the portable terminal device.

In a still yet another aspect of the present invention, in a font processing program to be executed in a terminal device having a computer, the font processing program makes the computer function as a data acquiring device for acquiring font data of a bitmap font, a lengthwise analyzing device for analyzing the pixel formation of the font data lengthwise, a widthwise enlargement/reduction device for enlarging or reducing the font data widthwise based on the lengthwise analysis result, a widthwise analyzing device for analyzing the pixel formation of the font data widthwise, and a lengthwise enlargement/reduction device for enlarging or reducing the font data lengthwise based on the widthwise analysis result.

In another aspect of the present invention, in a font processing program to be executed in a terminal device having a computer, the font processing program makes the computer function as a data acquiring device for acquiring font data of a bitmap font, a widthwise enlargement processing device for enlarging the font data widthwise, and a lengthwise enlargement processing device for enlarging the font data lengthwise. The widthwise enlargement processing device can include a dividing device for dividing the font data into a plurality of columns, a cost calculating device for calculating a cost that represents a line segment volume of a pixel formation, for each column, and an enlarging device for executing widthwise pixel enlargement for a desired number of columns in the descending or ascending order of column cost, and the lengthwise enlargement processing device can include a dividing device for dividing the font data into a plurality of rows, a cost calculating device for calculating a cost that represents a line segment volume of a pixel formation, for each row, and an enlarging device for executing lengthwise pixel enlargement for a desired number of rows in the ascending order of row cost or descending order of row cost.

In yet another aspect of the present invention, in a font processing program to be executed in a terminal device having a computer, the font processing program makes the computer function as a data acquiring device for acquiring font data of a bitmap font, a widthwise reduction processing device for reducing the font data widthwise, and a lengthwise reduction processing device for reducing the font data lengthwise. The widthwise reduction processing device can include a dividing device for dividing the font data into a plurality of columns, a cost calculating device for calculating a cost that represents a degree of likeness to a pixel formation in an adjacent column, for each column, and a reducing device for executing widthwise pixel reduction for a desired number of columns in the descending or ascending order of column cost, and the lengthwise reduction processing device can include a dividing device for dividing the font data into a plurality of rows, a cost calculating device for calculating a cost that represents a degree of likeness to a pixel formation in an adjacent row, for each row, and a reducing device for executing lengthwise pixel reduction for a desired number of rows in the ascending order of row cost or descending order of row cost.

The font processing device can be accomplished by executing the font processing program with the computer in the terminal device.

In another aspect of the present invention, a font processing device can include a receiving device for receiving a font modification indication, a data acquiring device for acquiring font data of a bitmap font, a widthwise modifying device for, when the font modification indication includes widthwise font modification, analyzing the pixel formation of the font data lengthwise and enlarging or reducing the font data widthwise based on the lengthwise analysis result, and a lengthwise modifying device for, when the font modification indication includes widthwise font modification, analyzing the pixel formation of the font data widthwise and enlarging or reducing the font data lengthwise based on the widthwise analysis result.

In the same manner, a method of processing font can include a step of receiving a font modification indication, a step of acquiring font data of a bitmap font, a step of widthwise modifying, when the font modification indication includes widthwise font modification, of analyzing the pixel formation of the font data lengthwise and enlarging or reducing the font data widthwise based on the lengthwise analysis result, and a step of lengthwise modifying, when the font modification indication includes widthwise font modification, of analyzing the pixel formation of the font data widthwise and enlarging or reducing the font data lengthwise based on the widthwise analysis result.

The above font processing device or method modifies the font by enlarging or reducing the bitmap font with an enlargement ratio or a reduction ratio. First, a font modification indication is received, and font data of the bitmap font to be modified is acquired. When the font modification indication includes widthwise modification, the font data is analyzed lengthwise, and then, the font data is enlarged or reduced widthwise based on the analysis result. In the same manner, when the font modification indication includes lengthwise modification, the font data is analyzed widthwise, and then, the font data is enlarged or reduced lengthwise based on the analysis result. Thereby, corresponding to pixel formation of font data to be modified, font is modified by executing suitable enlargement/reduction processing lengthwise and widthwise, respectively so that unbalance of modified font data is prevented.

In an aspect of the above-described font processing device, the widthwise modifying device can include a dividing device for dividing the font data into a plurality of columns, a calculating device for calculating a cost that represents pixel formation features, for each column, and a executing device for executing pixel enlargement or reduction processing for a desired number of columns in the descending or ascending order of column cost.

In this font processing device, a cost is evaluated from column direction (lengthwise) pixel formation of pixels forming the font data, and then, enlargement/reduction processing is executed based on the value. Thus, pixel formation analysis can be executed by simple cost calculation to thereby enable speedy process.

In another aspect of the font processing device, the lengthwise analyzing device can include a dividing device for dividing the font data into a plurality of rows, a calculating device for calculating a cost that represents pixel formation features, for each row, and an executing device for executing pixel enlargement or reduction processing for a desired number of rows in the ascending order of row cost or descending order of row cost.

In this font processing device, a cost is evaluated from row direction (widthwise) pixel formation of pixels forming the font data, and then, enlargement/reduction processing is executed based on the value. Thus, pixel formation analysis can be executed by simple cost calculation to thereby enable speedy process.

In another aspect of the present invention, a font processing device can include a receiving device for receiving a font modification indication including lengthwise and widthwise modification ratios, a data acquiring device for acquiring font data of a bitmap font, a widthwise modifying device for processing widthwise modification of the font data in accordance with the widthwise modification ratio, and a lengthwise modifying device for processing lengthwise modification of the font data in accordance with the lengthwise modification ratio. The widthwise modifying device can include a dividing device for dividing the font data into a plurality of columns, a first cost calculating device for calculating a cost that represents pixel formation features, for each of the plurality of columns, and a widthwise enlarging or reducing device for enlarging or reducing a first desired number of columns widthwise in the descending or ascending order of column cost, and the lengthwise modifying device can include a dividing device for dividing the font data into a plurality of rows, a second cost calculating device for calculating a cost that represents pixel formation features, for each of the plurality of rows, and a lengthwise enlarging or reducing device for enlarging or reducing a second desired number of rows lengthwise in the ascending order of row cost or descending order of row cost.

In the same manner, a method of processing a font can include a step of receiving a font modification indication including lengthwise and widthwise modification ratio, a step of acquiring font data of a bitmap font, a step of processing widthwise modification of the font data in accordance with the widthwise modification ratio, and a step of processing lengthwise modification of the font data in accordance with the lengthwise modification ratio. The step of processing widthwise modification of the font data can include a step of dividing the font data into a plurality of columns, a step of calculating a first cost that represents pixel formation features, for each of the plurality of columns, and a step of firstly enlarging or reducing a first desired number of columns widthwise in the descending or ascending order of column cost, and the step of processing a lengthwise modification of the font data comprises a step of dividing the font data into a plurality of rows, a step of calculating a second cost that represents pixel formation features, for each of the plurality of rows, and a step of secondly enlarging or reducing a second desired number of rows lengthwise in the ascending order of row cost or descending order of row cost.

According to this font processing device or the method of processing a font, font data is divided into a plurality of columns and a cost is calculated for each of the plurality of columns. Further, in the same manner, font data is divided into a plurality of rows and a cost is calculated for each of the plurality of rows. And, a font modification is accomplished through enlarging or reducing a desired number of columns or rows in accordance with the cost.

In an aspect of the font processing device, the first desired number depends on the number of lengthwise and widthwise pixels of the font data and on the widthwise modification ratio, and the second desired number depends on the number of pixels lengthwise and widthwise of the font data and on the lengthwise modification ratio. Thus, the required number of columns and rows is enlarged/reduced so as to have a modification ratio designated by font modification indication.

In yet another aspect of the font processing device, the cost calculating device calculate a cost that represents a line segment volume of the pixel formation for each of the plurality of columns or rows when the modification processing is an enlargement processing, and calculate a cost that represents a degree of likeness between the pixel formation in the current column or row and the pixel formation in an adjacent column or row, for each of the plurality of columns or rows, when the modification processing is a reduction processing.

According to this aspect, when executing an enlargement for font modification, a cost is line segment volume of pixel, that is, an index representing whether the pixel forming the column is close to a simple point or a set of points, or close to a line segment. And, column or row is enlarged in the ascending order of cost. Thus, a row having a pixel formation close to a point or a set of point is enlarged in advance so that a row having a pixel formation close to a line segment is difficult to be enlarged. Further, when executing a reduction for font modification, a cost represents a degree of likeness to a pixel formation in an adjacent column. And, column is enlarged widthwise in the ascending order of cost. Thereby, a portion, that is adjacent to the column having similar pixel formation, is previously reduced. Thus, breaking down of character balance as a whole is disappeared so that natural enlargement can be obtained.

In still yet another aspect of the font processing device, when calculating a cost representing line segment volume, the cost calculating device calculates, as the cost, the number of pixels forming the column or the row for each column or each row, and adds the number of pixels having adjacent pixels in the column or row to the cost.

Further, in still yet another aspect of the font processing device, when calculating a cost representing the line segment volume, the cost calculating device calculates the number of pixels forming the column or the row for each column or each row, and further adds the number of pixels having adjacent pixels in the column or the row direction to the number of pixels forming the column or the row, and calculates an inverse number of the added result as a cost.

In yet another aspect of the font processing device, when calculating a cost representing the degree of likeness, the cost calculating device calculate for each column and each row the cost based on the exclusive-OR of the pixel formation of the column or the row and the pixel formation of a column or a row adjacent to the column or the row.

In these aspects, since the cost calculating device calculates the cost by simple addition process, font enlargement processing can be speedily executed through simple configuration.

In still yet another aspect of the font processing device, the font data can include processing order information that represents the order of the lengthwise modification processing and the widthwise modification processing to be executed in the modification processing of the font data, and further includes an order controlling device for controlling the execution order of the lengthwise modification processing and the widthwise modification processing based on the processing order information.

According to this aspect, for each target font to be modified, it is decided in advance which of the lengthwise modification processing and the widthwise modification processing is early executed in order to obtain the font pertinent to natural modification font, and the processing order information representing the order is included in the font data. Thus, the font processing device is capable of obtaining a natural modification font by deciding the execution order of lengthwise modification and widthwise modification with reference to the processing order information.

In a still yet another aspect of the present invention, a terminal device can include the font processing device, a memory for storing the font data generated by the font processing device, and a display part for displaying the font data generated by the font processing device. The terminal device, for example, can be a portable terminal device such as cellular phones or PDA and so on. In the font processing device according to the present invention, since modification of the font can be easily executed by a simple operation, natural font modification can be executed in the portable terminal device.

In still yet another aspect of the present invention, in a font processing program to be executed in a terminal device having a computer, the font processing program makes the computer function as a receiving device for receiving a font modification indication, a data acquiring device for acquiring font data of a bitmap font, a widthwise modifying device for analyzing the pixel formation of the font data lengthwise, when the font modification indication includes widthwise font modification, and enlarging or reducing the font data widthwise based on the lengthwise analysis result, and a lengthwise modifying device for analyzing the pixel formation of the font data widthwise, when the font modification indication includes widthwise font modification, and enlarging or reducing the font data lengthwise based on the widthwise analysis result.

In another aspect of the present invention, in a font processing program to be executed in a terminal device having a computer, the font processing program makes the computer function as a receiving device for receiving a font modification indication including lengthwise and widthwise modification ratios, a data acquiring device for acquiring font data of a bitmap font, a widthwise modifying device for processing widthwise modification of the font data in accordance with the widthwise modification ratio, and a lengthwise modifying device for processing lengthwise modification of the font data in accordance with the lengthwise modification ratio. The widthwise modifying device can include a dividing device for dividing the font data into a plurality of columns, a first cost calculating device for calculating a cost that represents pixel formation features, for each of the plurality of columns, and a widthwise enlarging or reducing device for enlarging or reducing a first desired number of columns widthwise in the descending or ascending order of column cost, and the lengthwise modifying device can include a dividing device for dividing the font data into a plurality of rows, a second cost calculating device for calculating a cost that represents pixel formation features, for each of the plurality of rows, and lengthwise enlarging or reducing device for enlarging or reducing a second desired number of rows lengthwise in the ascending order of row cost or descending order of row cost.

The font processing device can be accomplished by executing the font processing program through the computer in the terminal device.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Now, the preferred embodiments of the present invention will be described with reference to accompanying drawings.

Above all, the first embodiment of the present invention will be described. The first embodiment relates to font enlargement/reduction processing.

Figure 1:
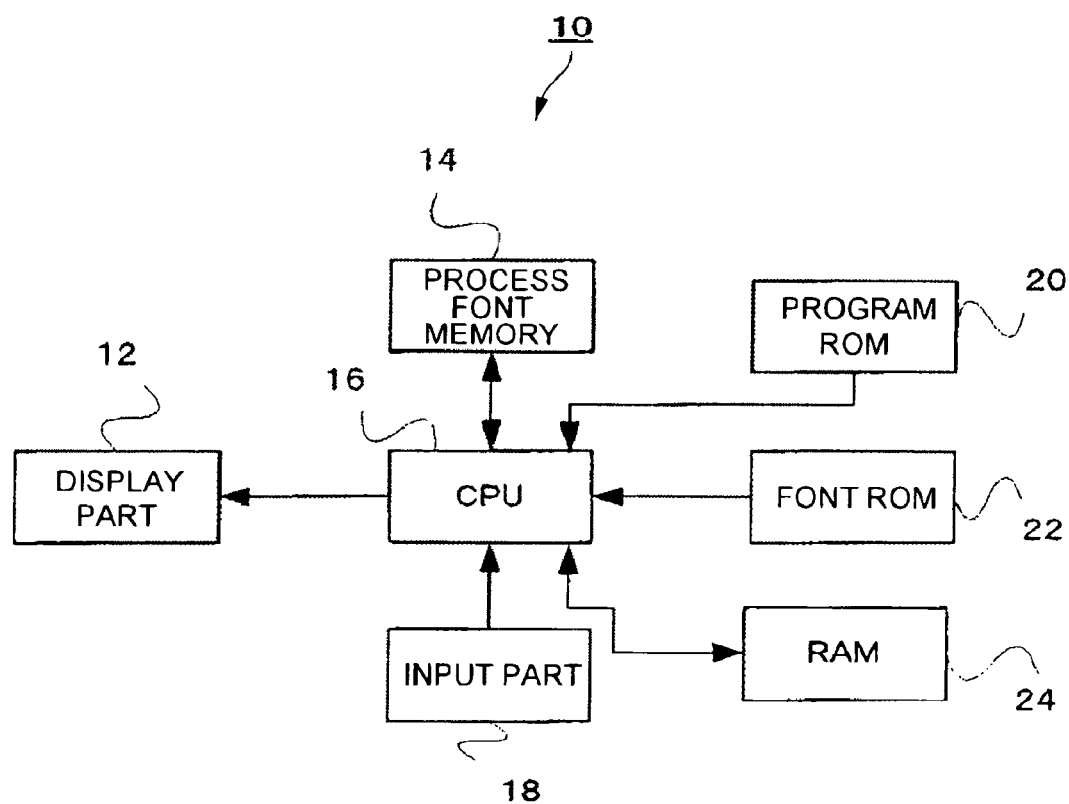
FIG. 1 is a schematic block diagram of a portable terminal device to which enlargement/reduction processing of bitmap font according to the first embodiment of the present invention is applied.

FIG. 1 illustrates the schematic structure of a portable terminal device to which enlargement/reduction processing of bitmap font according to the first embodiment of the present invention is applied. In FIG. 1, a portable terminal device 10 is a terminal device, which has a relatively small image display area, such as cellular phones, PDAs, or the like.

The portable terminal device 10 can include a display part 12, a process font memory 14, a CPU 16, an input part 18, a program ROM 20, a font ROM 22, and a RAM 24. The display part 12 may be a lightweight and thin type display such as an LCD (Liquid Crystal Display), and displays a character formed by bitmap font in a display area. The input part 18, which can be configured by each operation button in cellular phones or a tablet detecting touch by a touch pen, and the like in PDAs, is used when a user executes various indications and selections. An indication and a selection, which are put into the input part 18, are converted into electric signals and transmitted to the CPU 16.

The program ROM 20 stores each program for executing various functions of the portable terminal device 10, and particularly in this embodiment stores an enlargement/reduction program of bitmap font (hereinafter, referred to as 'font enlargement/reduction program') and a display program of character using bitmap font, and so on.

The font ROM 22 stores an original data (also called matrix data) of bitmap font. Further, the original data of bitmap font is generally configured by font having same aspect ratio (also called square font), such as 16×16 dot.

The RAM 24 is used as a memory for work when an original data of bitmap font is enlargement/reduction processed according to the enlargement/reduction program of bitmap font. Meanwhile, the process font memory 14 temporarily stores font (hereinafter, also referred to as process font) that is configured by enlargement or reduction processing by enlargement/reduction program of bitmap font. The process font memory 14 is generally composed of RAM or flash memory and so on, and maintains storage until the power of the portable terminal device 10 is off.

The CPU 16 executes each function of the portable terminal device 10 by executing each program stored in the program ROM 20. Particularly, in this embodiment, character is displayed on the display part 12 by reading and executing a character display program stored in the program ROM 20. Likewise, by reading and executing a font enlargement/reduction program stored in the program ROM 20, a process font is produced by enlarging and reducing an original data of bitmap font stored in the font ROM 22. Further, though the CPU 16 executes various functions of the portable terminal device 10 by executing each program in addition to above programs, those are not directly related to the present invention. Thus, the description of them will be omitted.

Next, font enlargement/reduction processing that is feature of the present invention will be described. As described above, the CPU 16 executes an enlargement/reduction program stored in the program ROM 20 to execute font enlargement/reduction processing. Hereinafter, font enlargement processing and font reduction processing will be described in the order.

Figure 2:
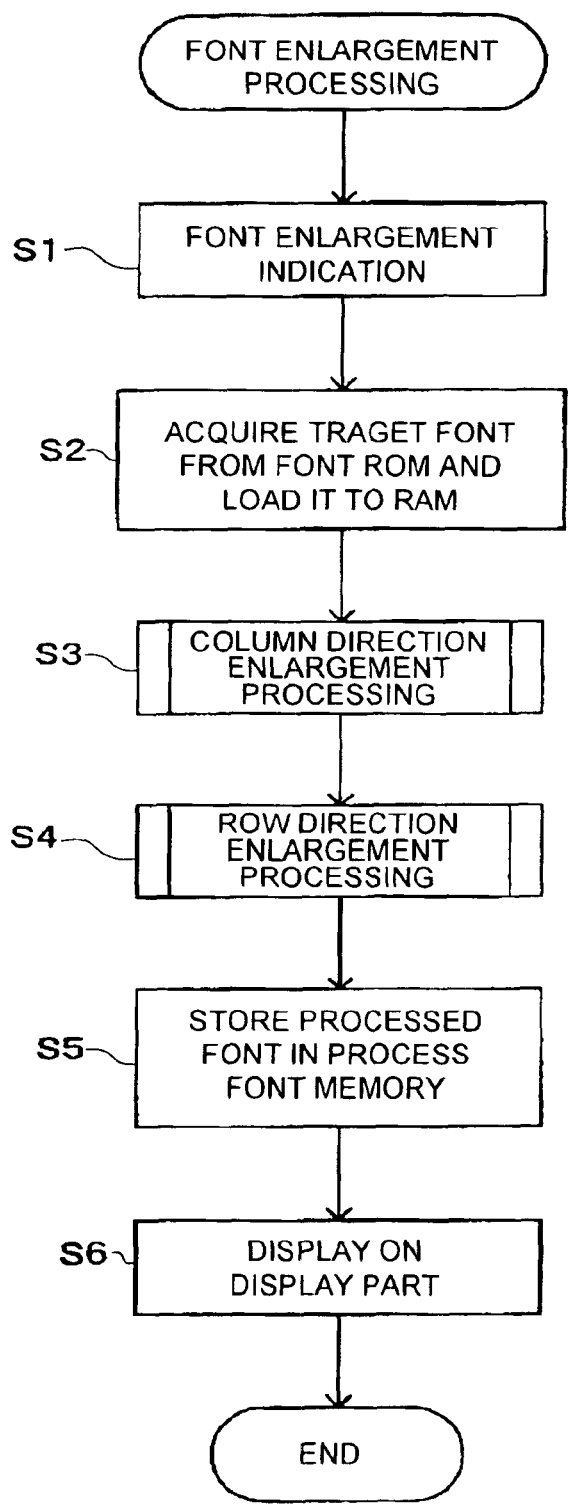
FIG. 2 is a flowchart illustrating an exemplary font enlargement processing.
Figure 3:
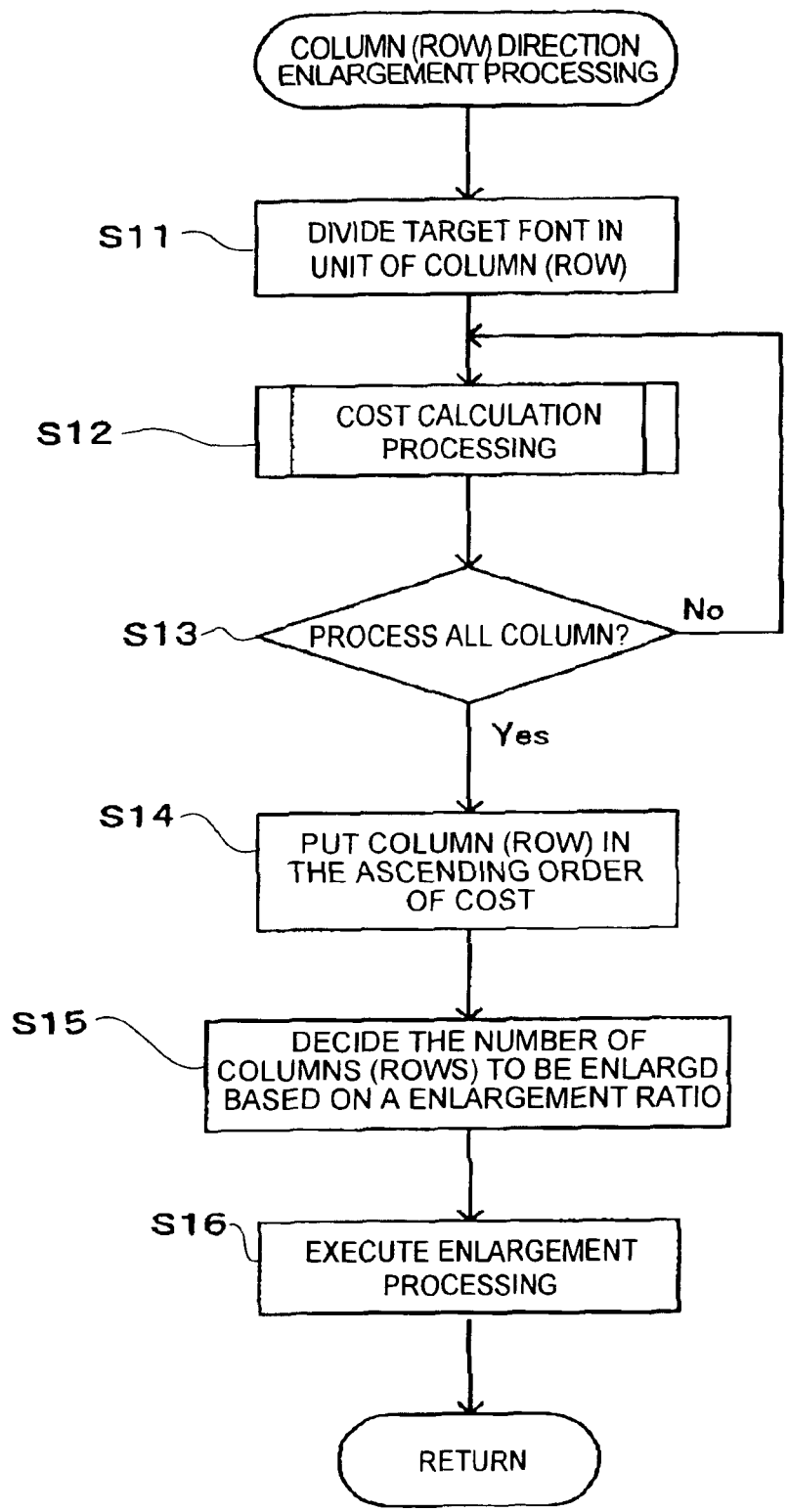
FIG. 3 is a flowchart illustrating an exemplary column (row) direction enlargement processing.
Figure 4:
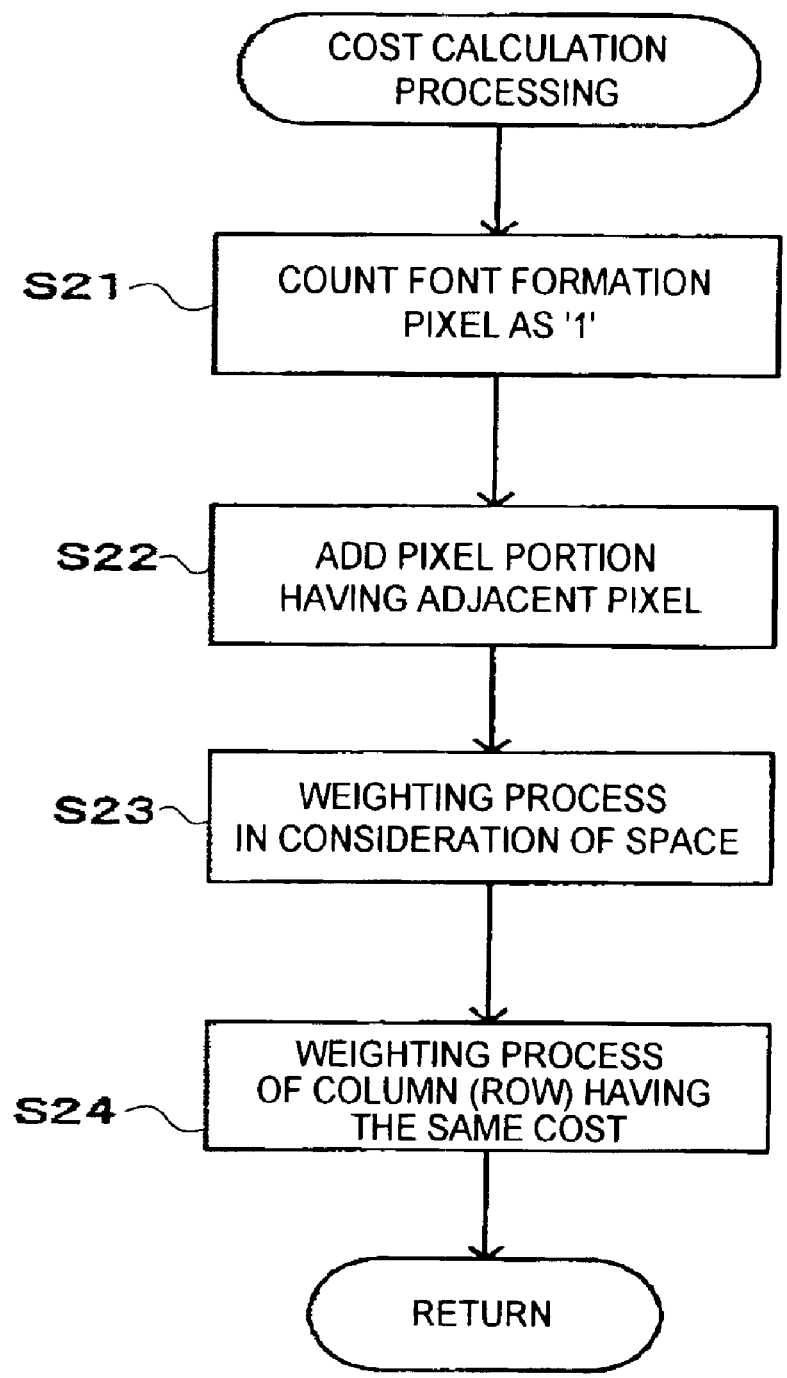
FIG. 4 is a flowchart illustrating an exemplary cost calculation processing in font enlargement processing and font modification processing by enlargement.
Figure 5A:
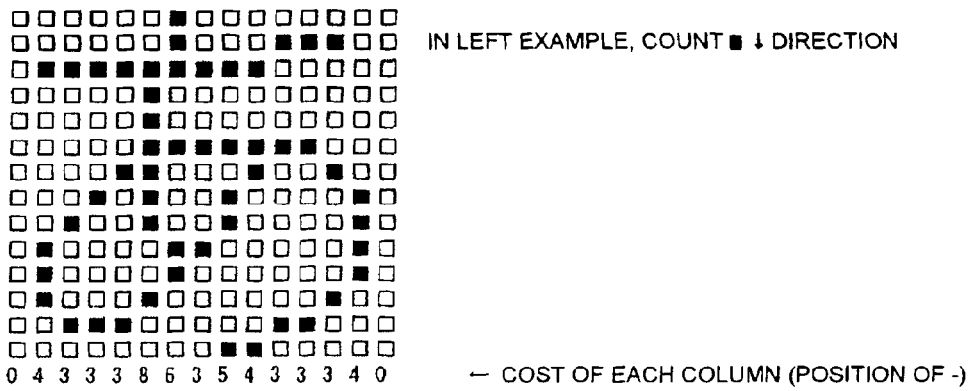
FIG. 5 is a diagram illustrating an example of cost calculation processing in font enlargement processing and font modification processing by enlargement.

First, font enlargement processing will be described with referenced to FIGS. 2 to 7. FIGS. 2 to 4 are flowcharts illustrating main routine and sub routine of font enlargement processing, and FIGS. 5 to 7 are diagrams illustrating each step of font enlargement processing.

Referring to FIG. 2, the CPU 16 accepts font enlargement indication (step S1). Font enlargement indication, for example, when a user executes preset/selection of size of display font or preset/selection of display mode by operating the input part 18, is generated based on indication from the input part 18. Further, though except a user's indication, font enlargement needs to be required in order to correspond to display contents on the display part 12. For example, when a character data is displayed in a display area, it might be automatically required to enlarge font by using a character display program.

When a font enlargement indication is generated, the CPU 16 reads the original data of a target font from the font ROM 22, and loads it on the RAM 24 that is a work memory (step S2). Next, the CPU 16 executes column direction enlargement processing to early enlarge the target font in the column direction (step S3), then, executes row direction enlargement processing to more enlarge the column direction enlarged font in the row direction (step S4). In this embodiment, also, a column direction enlargement ratio and a row direction enlargement ratio are set to be the same. Using this technique, when a font enlargement has been finished in the column direction and in the row direction, the CPU 16 temporarily stores the enlarged font data in the font memory 14 as a process font (step S5). Moreover, the CPU 16 displays it on the display part 12 (step S6). As a result, a font is enlarged, and then displayed on the display part 12.

Next, the column direction enlargement processing which is executed in the step S3 will be described in detail with reference to the flowchart of FIG. 3. In FIG. 3, first, the CPU 16 divides a target font into a plurality of columns (step S11). Then, the CPU 16 calculates cost per each column that is obtained from division (step S12). In this point, a cost is a value that is calculated from the number of pixels forming a font and whether an adjacent pixel is present or not, and represents a line segment volume in font enlargement processing. That is, it means that higher cost, density of line segment, not point and a set of points, included in the column is higher.

In FIG. 4, cost calculation processing in the step S12 is illustrated in detail. In cost calculation processing, as shown in FIG. 5(a), first, the number of font elements in unit of column is counted (step S21). In FIG. 5(a), numbers (0, 4, 3, 3 . . . from the left), which are noted below each column, represent costs of each column.

Figure 5B:
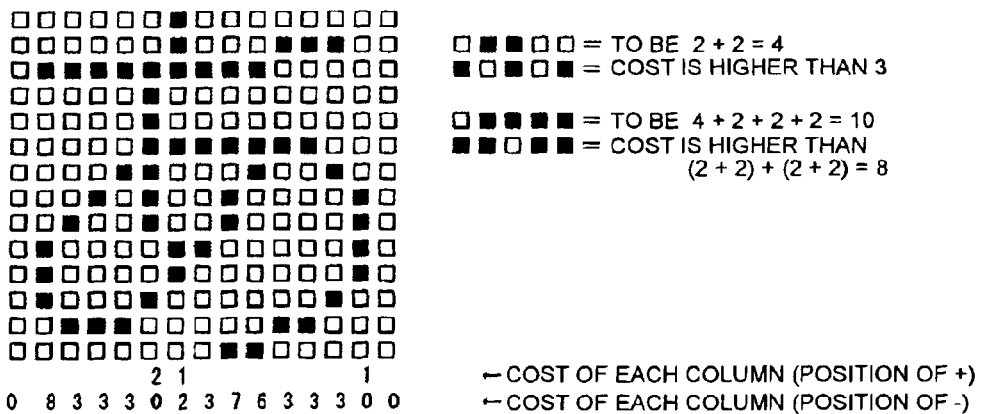

Next, as shown in FIG. 5(b), addition is executed to a degree of pixel having adjacent font formation pixel (step S22). In an example of FIG. 5(b), for each font formation pixel having adjacent font formation pixel, '2' is added to each cost. Costs of each column, which are obtained from results of cost addition by a degree in an adjacent pixel, are noted below each column. By adding the cost to a pixel having an adjacent pixel, whether font formation pixel in the column is a point or close to a line segment is partly capable of being discriminated. That is, though the number of font formation pixels included in one column is the same, higher cost, the font formation pixel included in the column can be closer to a line segment. And, as will be described below, higher cost of a column, that is, closer to a line segment, the column is harder to be enlarged.

Figure 6A:
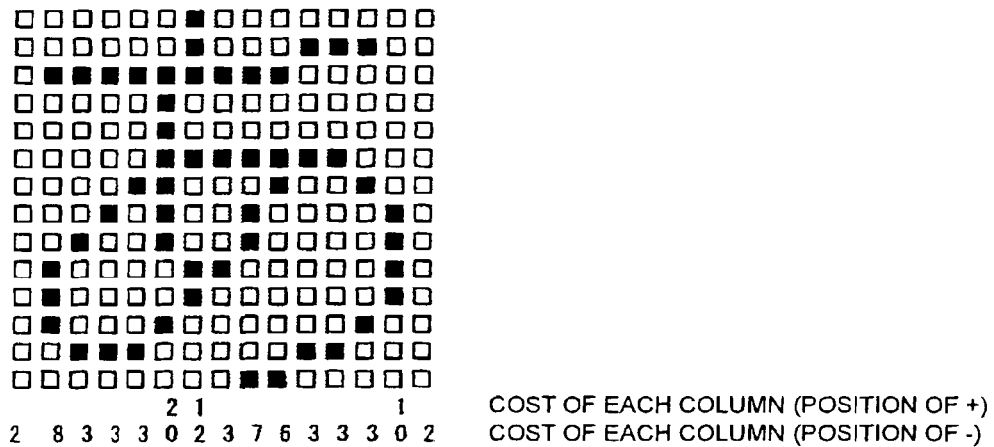
FIG. 6 is a diagram illustrating an example of cost calculation processing.
Figure 6B:
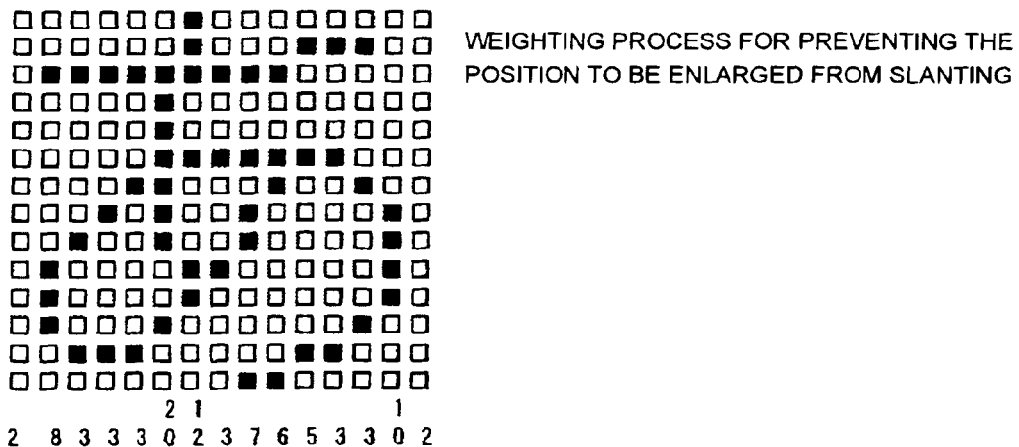

Next, as shown in FIG. 6(a), weighting process is executed in consideration of space (step S23). Concretely, against each column, when pixels of both ends are space (where there is no font formation pixel. Space is shown in FIGS. 5 and 6), '2' are added to the cost value. Further, when pixels positioned first inner from pixels of both ends are space, '1' is added to the cost value. This process is in consideration of balance as a character and balance in the case that characters are displayed widthwise to thereby form a composition. For example, when a character, such as hiragana 'し', is generally enlarged, enlargement is processed to a degree of left and right spaces, and thus, center font formation pixel forming a character is rarely enlarged.

As a result, in a view of an enlarged composition, while other characters is enlarged, font formation part of only the character 'し' is not adequately enlarged, and thus it is displayed small in itself. In order to eliminate this unfitness, space consideration weighting is executed. As the result of this process, the cost value of a column having space at top and bottom ends thereof become higher, and thus, the column is difficult to be enlarged.

Next, weighting process of the column that has the same cost is executed (step S24). In particular, given a column, the pattern of font formation pixel of the column is compared to that of an adjacent column, and when the pattern of font formation pixel of the column is equal to that of the adjacent column, '2' is added to the cost value of the column. This process is executed in consideration of balance as a character.

If the pattern of font formation pixel of the adjacent column is the same, cost values are the same in cost calculation up to the present. Thus, when a column having the cost value becomes an enlargement target by enlargement processing that will be described below, both adjacent columns are enlarged. As a result, both columns having the same pixel pattern are enlarged, and thus only a portion of one character is excessively enlarged. Accordingly, when an adjacent column has the same pattern, by increasing the cost value such that the adjacent column may be difficult to be enlarged, a specific portion of one character is prevented from inordinate enlargement.

Figure 7A:
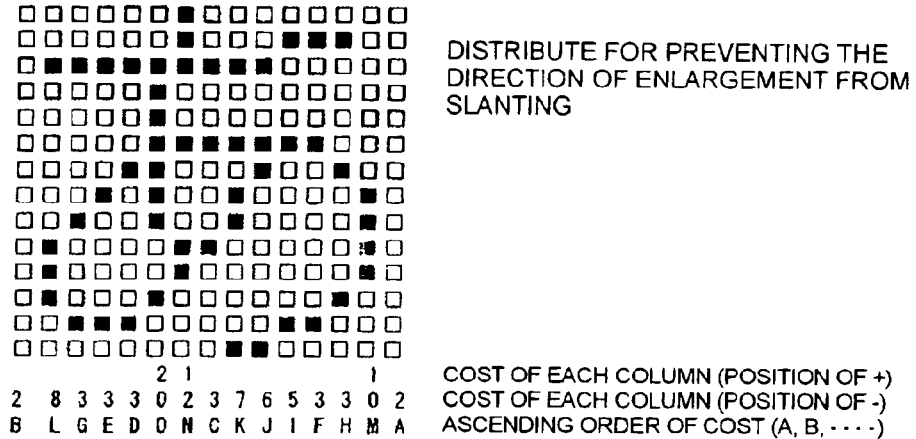
FIG. 7 is a diagram illustrating an example of column (row) direction enlargement processing and widthwise (lengthwise) enlargement processing.

When cost calculation processing is finished in this way, process returns to the column direction enlargement processing shown in FIG. 3. And, the CPU 16 decides whether cost calculation for each column of a target font is finished (step S13), if not, executes cost calculation for all the columns. When cost calculation for all the columns is finished (step S13; Yes), as shown in FIG. 7(a), the CPU 16 put columns in the ascending order of cost (step S14). In FIG. 7(a), columns are put A, B, C, in the ascending order of cost. Further, when a plurality of columns have the same cost, the plurality of columns are put in the order of closeness to the center of a character to thereby prevent enlargement direction from being unbalanced in the right and left direction. In an example of FIG. 7(a), though six columns have cost of '3', they are put C, D, E, F, G, H, respectively to be distributed to the right and left in the order of closeness to the center. By doing this, the order for an enlargement target is put so that balanced enlargement of the right and left from the center of the character may be processed.

When putting each column in the ascending order of cost is finished, the CPU 16 decides the number of columns based on an enlargement ratio (step S15). In this point, the enlargement ratio represents the ratio for enlarging an original data of a bitmap font by the current font enlargement processing. In step S11, when a font enlargement indication is generated, information about the enlargement ratio is included in the indication. For example, when a user indicates an enlargement of a character to easily see the character, the enlargement ratio (such as 120%, 150%, etc.) is selected. In addition, irrespective of a user's indication, even though font enlargement processing is automatically executed by process of the portable terminal device 10, the enlargement ratio is inevitably decided. Thus, based on the enlargement ratio, it is decided how many columns should be enlarged in columns of the target font. For example, when the number of columns of enlargement target font is 15 (15 dot) and an enlargement ratio is set to 120% (1.2 times), the number of columns for enlargement is 15×1.2=18 (column) to enlarge only three columns. Examples of FIGS. 7(a) and 7(b) correspond to the example of this case.

Figure 7B:
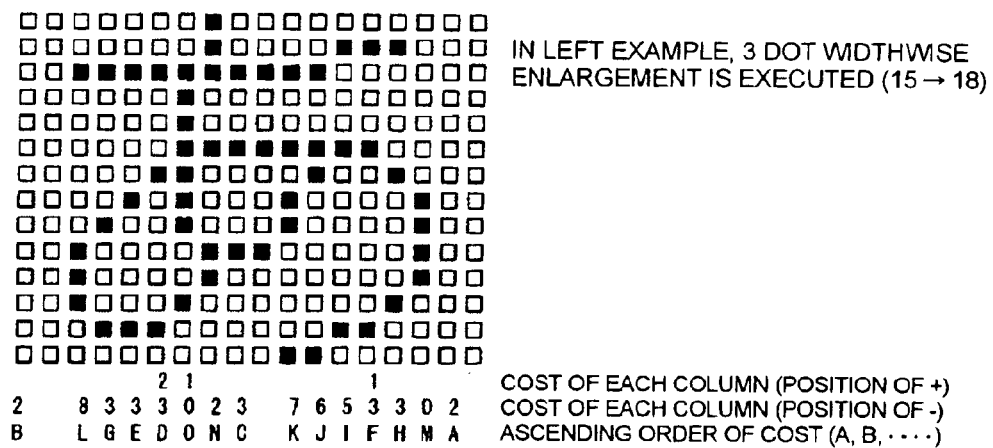

The number of columns for enlargement is decided as described above, the CPU 16 executes an enlargement processing (step S16). That is, in the ascending order of cost, columns are enlarged to a degree of the number of columns for enlargement. In an enlargement of this case, for example, the enlargement is processed by inserting a column having a font pixel pattern equal to that of the column for enlargement into the surroundings of the column for enlargement. In examples of FIGS. 7(a) and 7(b), since the number of columns for enlargement is 3 as described above, for 3 columns in the ascending order of cost ('A', 'B', 'C' columns), columns having the same font formation pixel pattern is inserted. As a result, as shown in FIG. 7(b), three columns are inserted, and an enlarged character having totally 18 columns (18 dots) widthwise is obtained.

In this way, column direction enlargement processing is finished, and process returns to the main routine shown in FIG. 2. Then, the CPU 16 executes row direction enlargement processing (step S4). Further, a target font in row direction enlargement processing becomes a column direction enlarged font. Thus, in examples of FIGS. 7(a) and 7(b), the font having 18 columns (dot) widthwise is processed.

Row direction enlargement processing executes process basically equal to column direction enlargement processing shown in FIG. 3, for each row, not each column. That is, enlargement target font is divided, for each row (step S11), cost calculation for each row is executed (step S12), each row is put in the ascending order of cost (step S14), the number of target rows for enlargement is decided based on an enlargement ratio (step S15), and enlargement processing for target rows is executed (step S16). Further, in the cost calculation processing shown in FIG. 4, weighting of cost being in consideration of lengthwise adjacent pixels (step S22), weighting being in consideration of space (step S23), and weighting of row having the same cost (step S24) are executed. In addition, in the enlargement processing of this example, since target font is enlarged lengthwise and widthwise with the same enlargement ratio, the enlargement ratio used in step S15 becomes equal to that used in the column direction enlargement processing.

In this way, an enlargement processing is finished in the column and row directions, the CPU 16 stores an obtained font, that is, process font in the process font memory 14 (step S5), and display on the display part 12, if necessary. As a result, an enlarged font is displayed on the display part 12 of the portable terminal device 10.

As described above, in the font enlargement processing according to the present invention, cost for each row and column is calculated based on the formation of the target font (font formation pixel pattern), and pertinent column and row are enlarged based on the cost. In particular, row and column close to a line segment is made difficult to be enlarged so as to prevent a portion corresponding to the line segment of a character from being excessively enlarged (step S22). Further, in a character having much space at the end part thereof, an inadequate enlargement of a character due to enlargement of only space is prevented (step S23). Moreover, when row and column having the same pattern are adjacent, they are made to be difficult to be enlarged so as to prevent a portion of a character from being excessively enlarged (step S24). Through this process, by considering a pixel pattern forming a character, an enlarged character is maintained balanced to enable natural enlargement.

Above described font enlargement processing is also executed one character by one character at the time when the character line to be displayed on the display part 12 is decided. Further, when a user indicates the size change of a display font, enlargement processing for all original data previously prepared in the font ROM 22 is executed, and the result may be stored in the process font memory 14. In any case, as described above, since font enlargement processing in itself is executed by simple operation of integer, time for the process is greatly short and there is no case of requiring process time that a user feels unpleasant.

Figure 8:
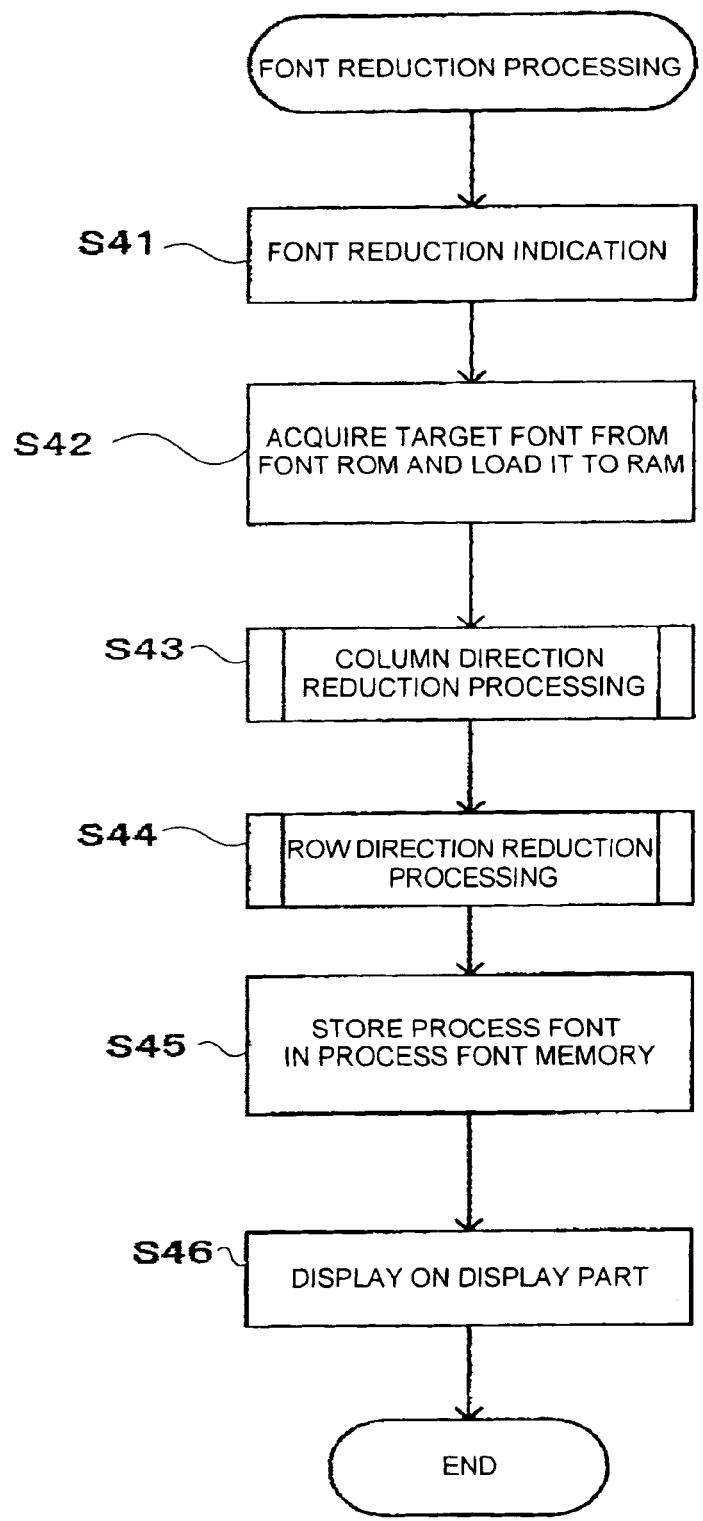
FIG. 8 is a flowchart illustrating an exemplary font reduction processing.

Next, font reduction processing will be described. Font reduction processing is shown in FIG. 8.

Font reduction processing is executed similarly to font enlargement processing basically. That is, the CPU 16 accepts a font reduction indication (step S41), reads the original data of a target font from the font ROM 22, and loads it on the RAM 24 that is a work memory (step S42). Next, the CPU 16 executes column direction reduction processing (step S43), then, executes row direction reduction processing (step S44). Then, when a process font is formed, the CPU 16 stores the configured process font in the font memory 14 (step S45), and displays it on the display part 12 (step S46). In this way, font reduction processing is executed.

Figure 9:
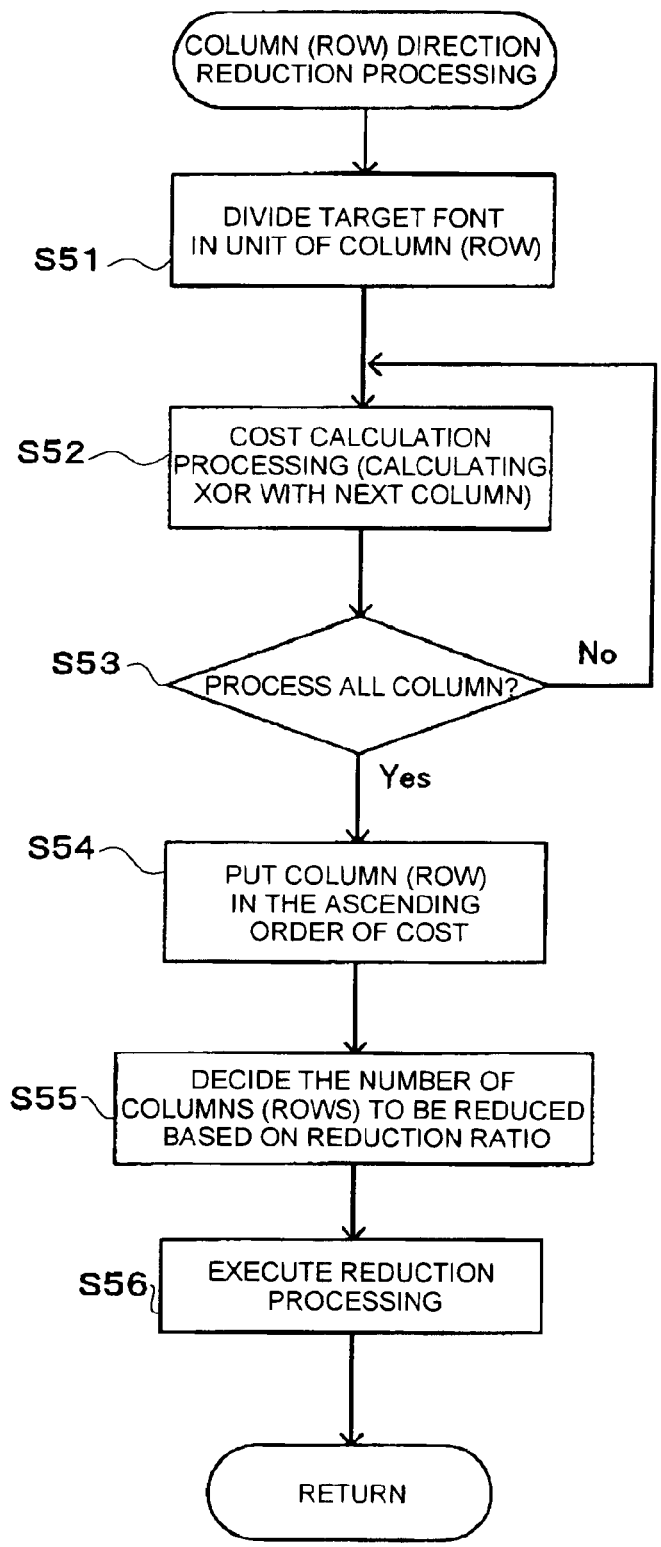
FIG. 9 is a flowchart illustrating an exemplary column (row) direction reduction processing.

Next, column direction reduction processing in font reduction processing will be described with reference to FIG. 9. FIG. 9 is a flowchart illustrating an exemplary column direction reduction processing. Column direction reduction processing shown in FIG. 9 is executed similarly to column direction enlargement processing shown in FIG. 3 basically in order. That is, the CPU 16 divides a target font in unit of column (step S51), calculates cost for each column (step S52), and when cost for each column is obtained (step S53; Yes), puts each column in the ascending order of cost (step S54). Then, the CPU 16 decides the number of target columns for reduction based on a reduction ratio (step S55), and executes reduction processing for target column (step S56).

In this way, column direction reduction processing in font reduction processing is basically equal to column direction enlargement processing in font enlargement processing. But, in relation to cost calculation method in step S52 and reduction method in step S56, column direction reduction processing in font reduction processing is not equal to that of font enlargement processing. This point will be described below.

First, cost calculation will be described. A cost in font enlargement processing represents a line segment volume, that is, whether pixel included in each column and row is close to a line segment or dot. Meanwhile, cost in font reduction processing represents a degree of likeness, that is, how much each column and row is similar to adjacent column and row, respectively. In particular, the CPU 16 calculates exclusive-OR (XOR) of each column and adjacent column.

When adjacent pixel is the same, exclusive-OR becomes '0', but adjacent pixel is not the same, exclusive-OR becomes '1'. Thus, exclusive-OR is calculated for each font formation pixel included in each column, and then, the number of font formation elements having '1' is set as a cost of the column. Accordingly, as the cost is higher, font pixel pattern of the column is not similar to that in an adjacent column, and, as the cost is lower, font pixel pattern of the column is closer to that in an adjacent column. In this way, cost becomes a value that represents similarity to adjacent column (strictly, non-similarity).

That is, low-cost of a column means that font pixel pattern of the column is similar to font pixel pattern in an adjacent column. Thus, by making preferentially a column having similar pixel pattern a reduction target, the similar column is deleted. This is based on conception that when adjacent column is similar to the column, though that is preferentially deleted, influence over the character totally, that is, incongruity is a little. By this way, natural reduction can be done.

After column direction reduction processing is finished, though row direction reduction processing is executed (step S44), this process is basically equal to column direction reduction processing. A target font is divided in unit of row (step S51), cost for each row is calculated (step S52), and when cost is obtained for each row (step S53; Yes), is put for each row in the ascending order of cost (step S54). Then, the CPU 16 decides the number of target rows for reduction based on a reduction ratio (step S55), and executes reduction processing for target row (step S56).

Figure 10A:
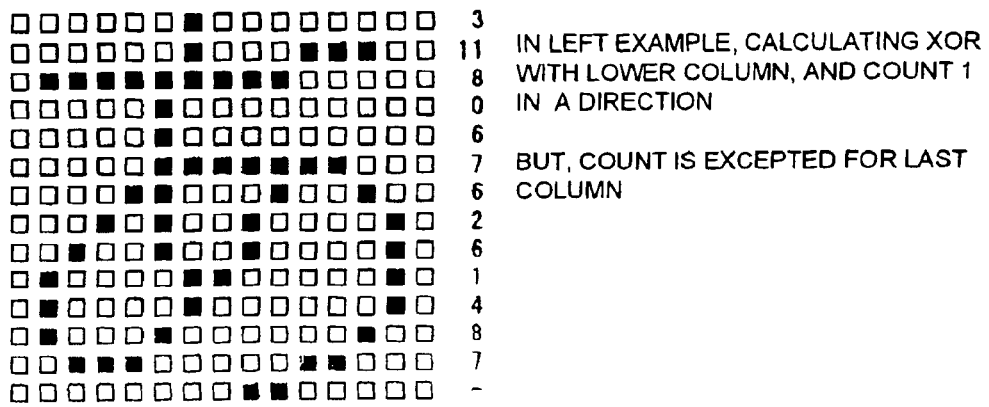
FIG. 10 is a diagram illustrating an example of cost calculation processing in font reduction processing and font modification processing by reduction.
Figure 10B:
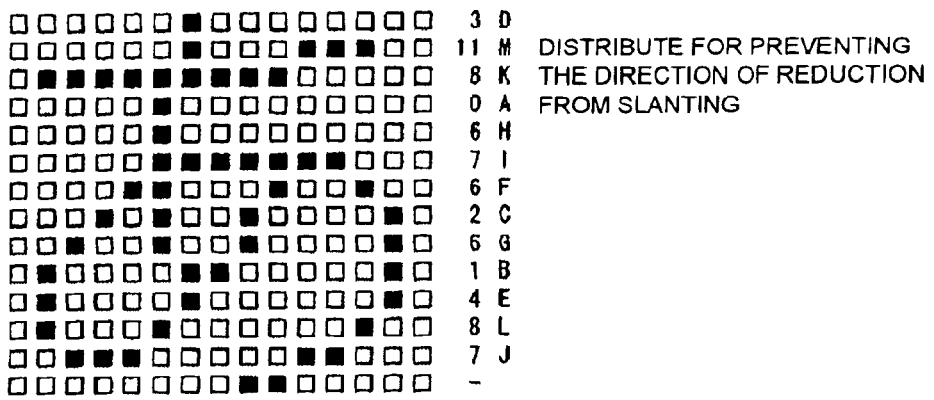
Figure 10C:
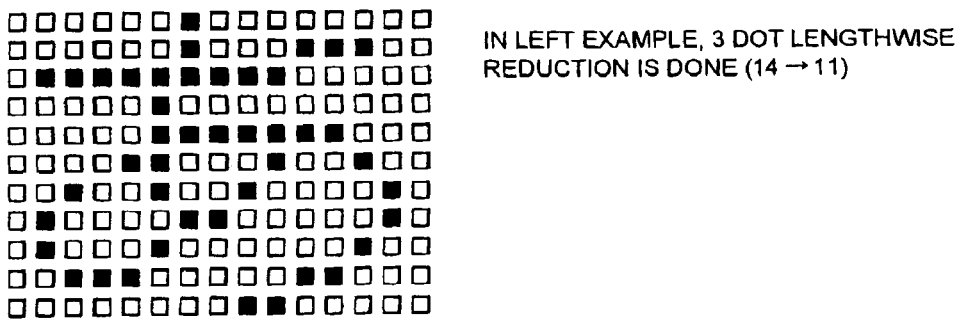

Aspects of row direction reduction processing are shown in FIGS. 10(a) to 10(c). First, as shown in FIG. 10(a), cost calculation for each row is executed, and then, rows are put in the ascending order of cost and become targets for reduction in the ascending order of row cost as shown in FIG. 10(b). In reduction processing of step S56, for example, columns are deleted in the ascending order of row cost as shown in FIG. 10(c). In an example of FIG. 10(c), 3 rows (A, B, C) having low-cost are deleted.

As described above, in reduction processing according to the present invention, a target font is divided in the column and row direction, and reduction is executed in consideration of a degree of similarity to each adjacent column and row. Thus, since the portion adjacent to column or row having similar font pixel pattern is preferentially reduced (deletion of column or row), it is rare that reduced font is unnatural.

Figure 11A:
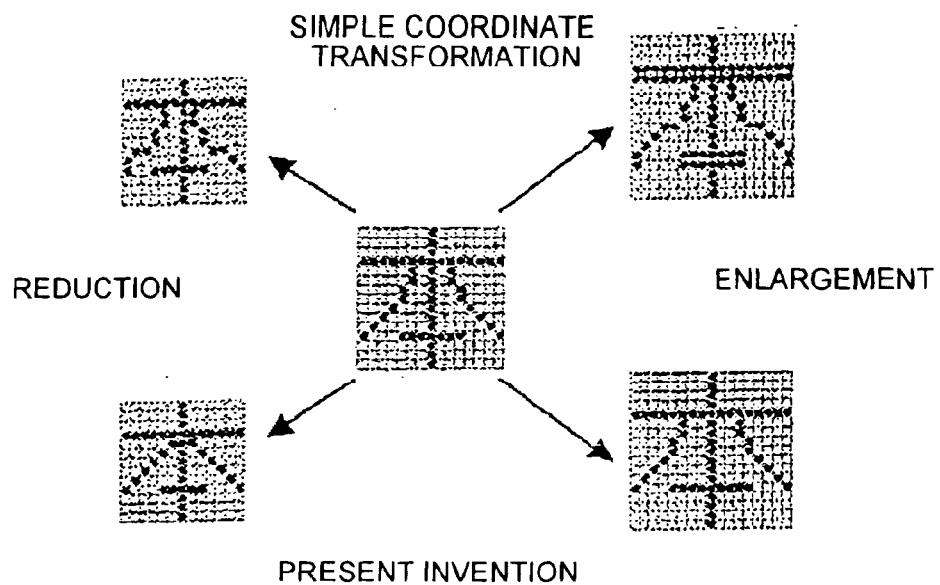
FIG. 11 is a diagram illustrating comparison between results of a font enlargement/reduction, modification processing and a font enlargement/reduction, modification processing by simple coordinate transformation.
Figure 11B:
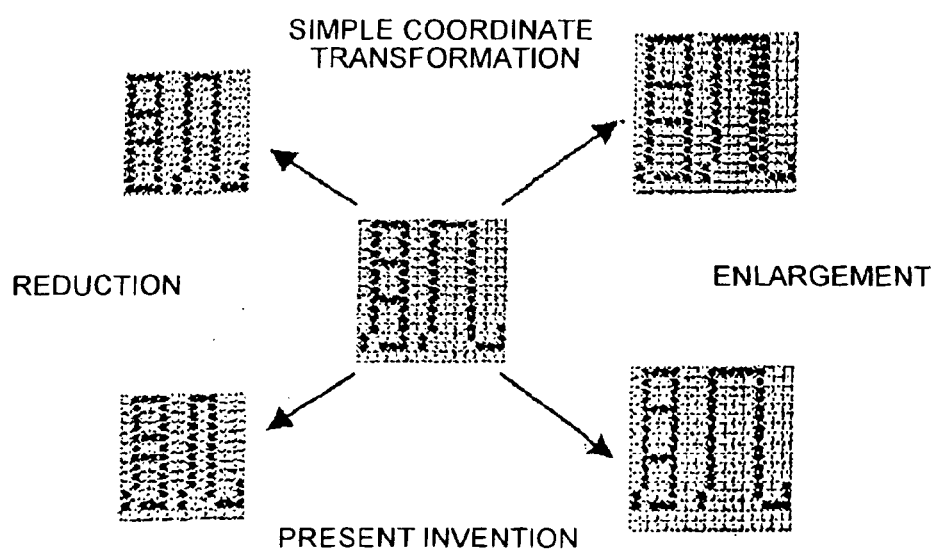

FIGS. 11(a) and 11(b) illustrate examples of enlargement/reduction font obtained by font enlargement/reduction processing by simple coordinate transformation and font enlargement/reduction processing according to the present invention. As apparent from FIGS. 11(a) and 11(b), in enlargement/reduction font obtained by simple coordinate transformation process, stroke of length or width is enlarged to be double (a widthwise line of the character '本', a lengthwise line '肌'), or slanting line is seen uneven. Further, because of reduction, balance of right and left of a character breaks down (balance of right and left of the character '本'), and pixels are connected to each other to thereby be seen another character (left of the character '肌' is seen '日', not '月'). In this point, font enlargement/reduction processing according to the present invention is capable of obtaining natural enlargement/reduction font without above unfitness.

Next, order of column direction process and row direction process in font enlargement/reduction processing will be described. In previously explained font enlargement/reduction processing, column direction enlargement/reduction processing is first executed, and then, row direction enlargement/reduction processing is executed (that is, widthwise enlargement/reduction processing is first executed, and then, lengthwise enlargement/reduction processing is executed). However, this is only an example, it is possible to execute firstly row direction enlargement/reduction processing, and to execute column direction enlargement/reduction processing. And, which is desirable depends on formation of the target font to be processed.

Figure 12A:
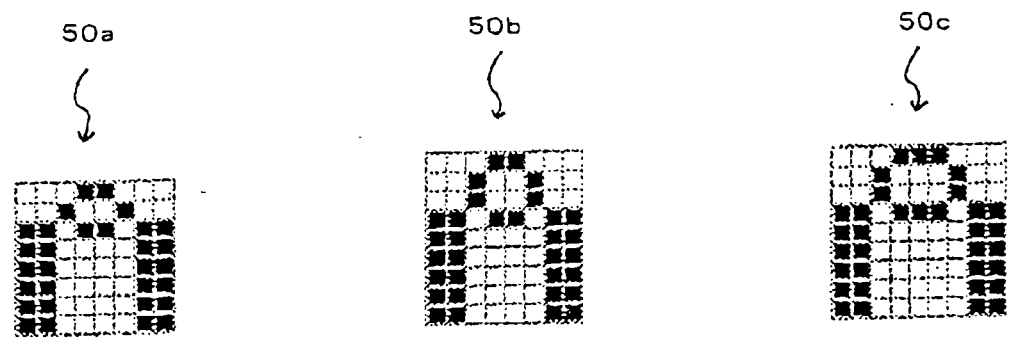
FIG. 12 is a diagram illustrating comparison between processing orders and process results of column direction process and row direction process, and an example of data formation of font data including processing order information.
Figure 12B:
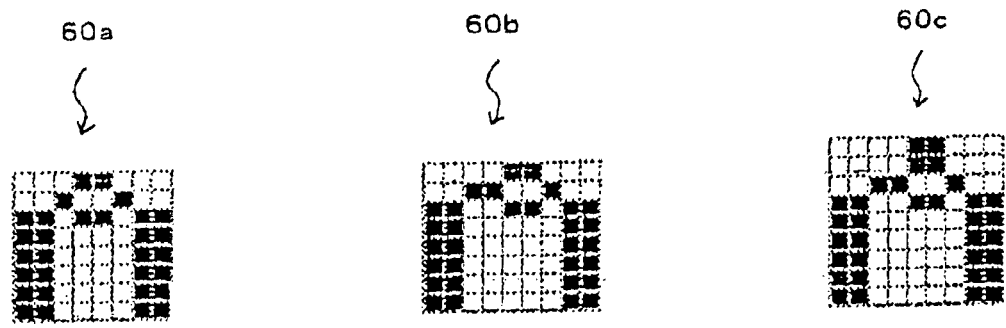

Examples are shown in FIGS. 12(a) and 12(b) in which a pixel pattern is enlarged in two orders that are not the same. In the example of FIG. 12(a), lengthwise enlargement is first executed, and widthwise enlargement is executed. In FIG. 12(a), if horizontal direction cost is calculated for the most left original data 50a, cost of the second column from the top is smallest. Thus, when the second column from the top is enlarged to a degree of 1 pixel, the center data 50b can be obtained. Next, if vertical direction cost is calculated for the center data 50b, costs of the fourth and fifth columns from the left are smallest. Thus, when one column is enlarged widthwise to a degree of 1 pixel, the most right enlarged data 50c can be obtained.

Meanwhile, in an example of FIG. 12(b), widthwise enlargement is firstly executed, and lengthwise enlargement is executed. In FIG. 12(b), if vertical direction cost is calculated for the most left original data 60a, cost of the fourth and fifth columns from the left are smallest. Thus, when one column is enlarged widthwise to a degree of 1 pixel, the center data 60b can be obtained. Next, if horizontal direction cost is calculated for the center data 60b, costs of the first and third columns from the top are smallest. Thus, when first column from the top is enlarged lengthwise to a degree of 1 pixel, the most right enlarged data 60c can be obtained.

Figure 12C:
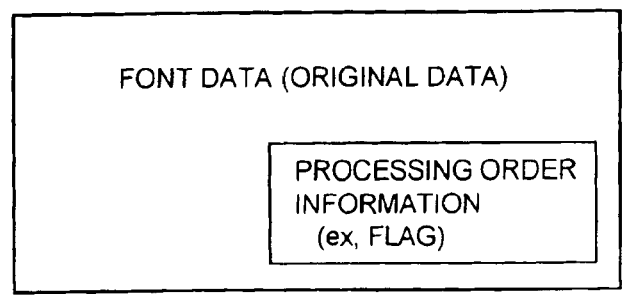

As described above, though original data are the same, obtained data are resultantly different from each other, which depends on whether enlargement is executed in the order of length→width or width→length. In examples of FIGS. 12(a) and 12(b), as shown in FIG. 12(a), natural enlargement is executed by enlarging the original data in the order of length→width. Thus, in order to execute natural enlargement for all characters, by experimentally executing enlargement processing for each character in the order of length→width and in the order of width→length, it is desirable to previously decide which order is pertinent to natural enlargement. Then, as schematically shown in FIG. 12(c), in enlargement/reduction processing executed for original data of each font, it is much desirable to attach processing order information (such as flag, etc.) that represents which order of length→width and width→length is desirable, as attribute data. If done in this way, the CPU 16 refers to the processing order information attached to the font that is read from font ROM 22 in font enlargement/reduction processing, and is desirable to execute enlargement/reduction of the font according to the processing order information. Further, though an equal font, since it might have each desirable processing order, that is different from each other, for enlargement and reduction, processing order information is desirable to be prepared for each enlargement/reduction. Moreover, when desirable processing order depends on enlargement ratio/reduction ratio, processing order information is preferable to be prepared for each enlargement ratio/reduction ratio.

Further, in this embodiment, though enlargement or reduction processing of pixel is executed in the ascending order of cost of columns or row, it should be understood that the scope of the present invention is not limit to this embodiment, for example, if inverse number of cost used in this embodiment is defined as a new cost, the same effect as those of this embodiment can be obtained by enlarging and reducing pixel in the descending order of column or row cost.

Next, the second embodiment of the present invention will be described. The second embodiment relates to font modification processing.

Figure 13:
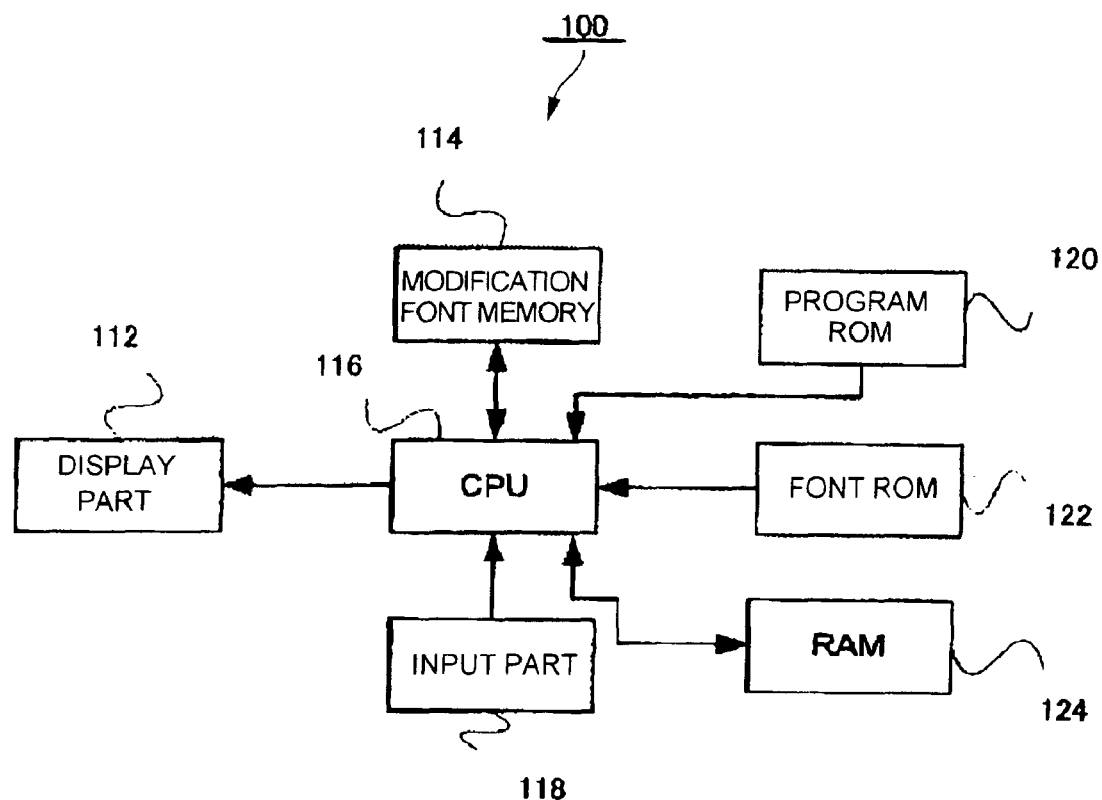
FIG. 13 is a schematic block diagram of a portable terminal device to which modification processing of bitmap font according to the second embodiment of the present invention is applied.

FIG. 13 illustrates the schematic structure of a portable terminal device to which enlargement and reduction processing of bitmap font according to the second embodiment of the present invention is applied. In FIG. 13, a portable terminal device 100 is a terminal device, which has a relatively small image display area, such as cellular phones, PDAs, or the like. The portable terminal device 100 comprises a display part 112, a modification font memory 114, a CPU 116, an input part 118, a program ROM 120, a font ROM 122, and a RAM 124.

The display part 112 may be a lightweight and thin type display such as an LCD (Liquid Crystal Display), and displays a character formed by bitmap font in a display area.

The input part 118, which can be configured by each operation button in cellular phones or a tablet detecting touch by a touch pen, etc. in PDAs, is used when a user executes various indications and selections. An indication and a selection, which are put into the input part 118, are converted into electric signals and transmitted to the CPU 116.

The program ROM 120 stores each program for executing various functions of the portable terminal device 100, and stores a modification program of bitmap font (hereinafter, referred to as 'font modification program') and a display program of character using bitmap font, and so on, particularly in this embodiment.

The font ROM 122 stores an original data (also called 'matrix data') of bitmap font. Further, the original data of bitmap font is generally configured by font having same aspect ratio (also called 'square font'), such as 16×16 dot.

The RAM 124 is used as a memory for work when an original data of bitmap font is modification processed according to the modification program of bitmap font. Meanwhile, the modification font memory 114 temporarily stores font (hereinafter, also referred to as 'process font') configured by enlargement or reduction processing by modification program of bitmap font. The modification font memory 114 is generally composed of RAM or flash memory and so on, and maintains storage until the power of the portable terminal device 100 is off.

The CPU 116 executes each function of the portable terminal device 100 by executing each program stored in the program ROM 120. Particularly, in this embodiment, character is displayed on the display part 112 by reading and executing a character display program stored in the program ROM 120. Likewise, by reading and executing a font modification program stored in the program ROM 120, a process font is generated by enlarging and reducing lengthwise and widthwise an original data of bitmap font stored in the font ROM 122. Further, though the CPU 116 executes various functions of the portable terminal device 100 by executing each program except above programs, those are not directly related to the present invention. Thus, the description of them will be omitted.

Next, font modification processing that is feature of the present invention will be described. As described above, the CPU 116 executes a modification sub program stored in the program ROM 120, to execute font modification processing. Font modification is practically realized by enlarging or reducing font data lengthwise or widthwise. When the lengthwise enlargement ratio or reduction ratio of a font is equal to the widthwise enlargement ratio or reduction ratio, the font is simply enlarged or reduced. But, when lengthwise enlargement ratio or reduction ratio of a font is not equal to the widthwise enlargement ratio or reduction ratio, the font is modified. Hereinafter, font modification processing by enlargement and reduction of the font will be described in order.

Figure 14:
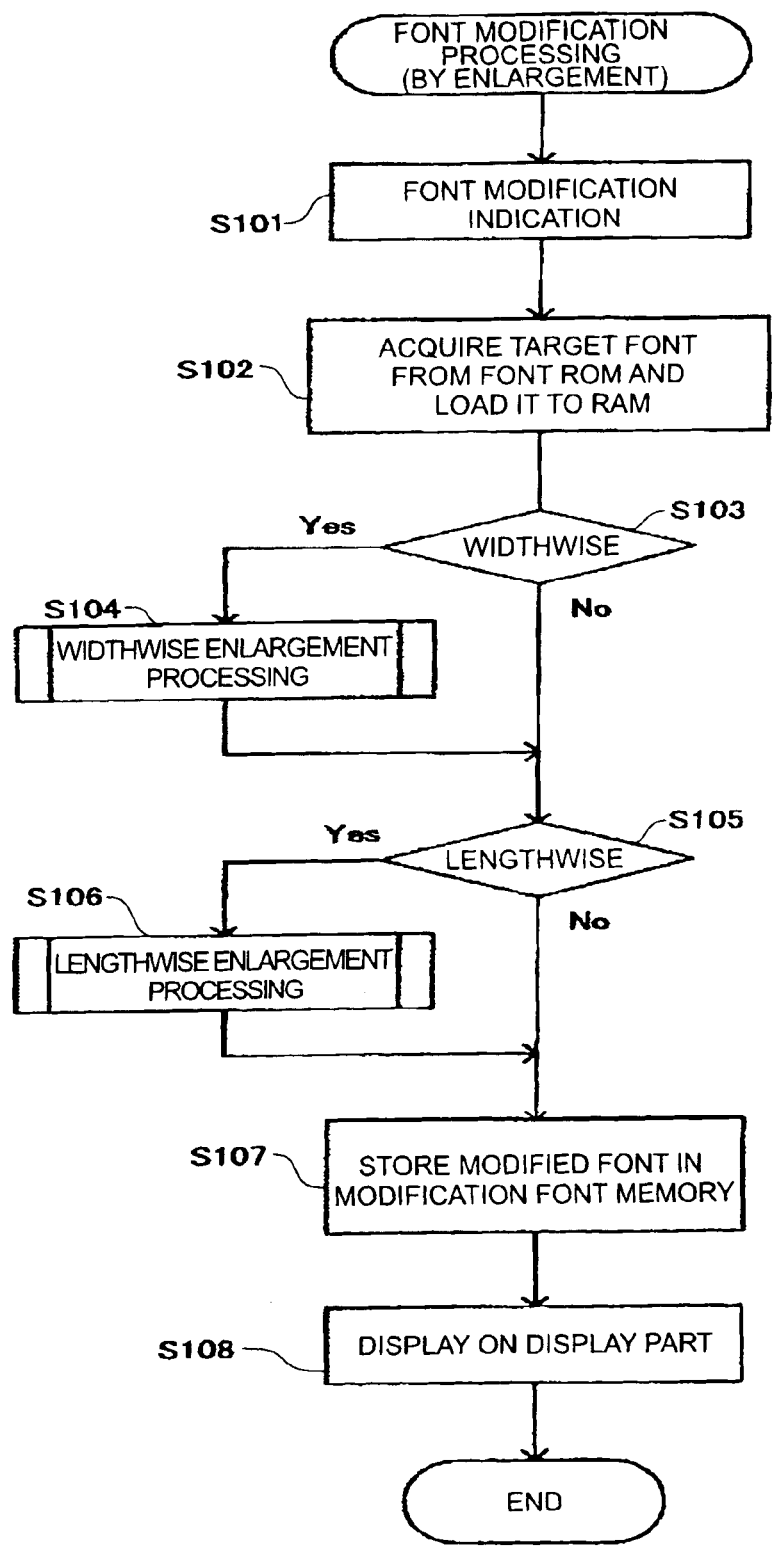
FIG. 14 is a flowchart illustrating an exemplary font modification processing.
Figure 15:
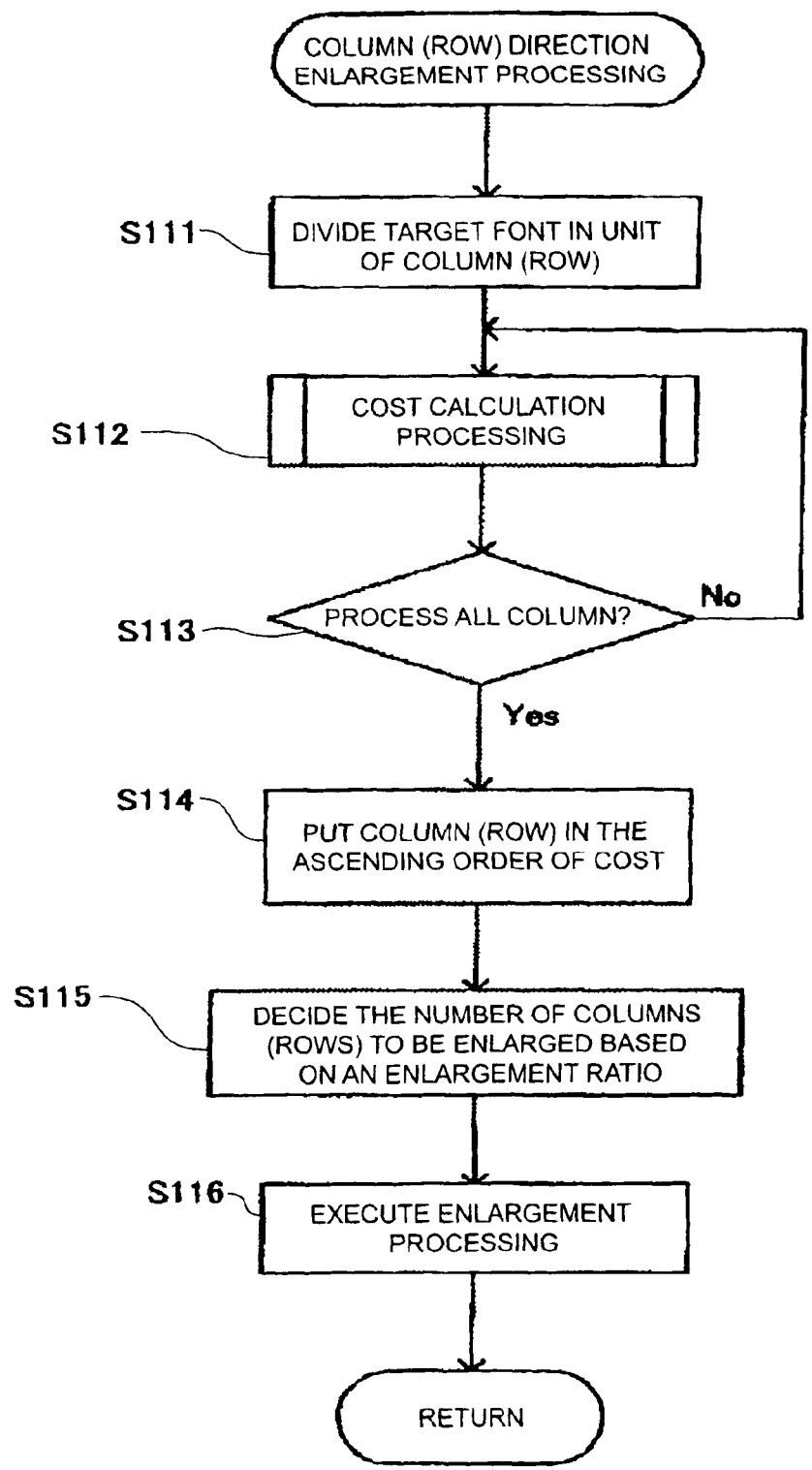
FIG. 15 is a flowchart illustrating an exemplary widthwise (lengthwise) enlargement processing.

First, font modification processing by enlargement will be described with reference to FIGS. 4 to 7, FIG. 14, and FIG. 15. FIG. 4, FIG. 14, and FIG. 15 are flowcharts illustrating exemplary main routine and sub routine of font modification processing by enlargement. FIGS. 5 to 7 are diagrams illustrating each step of font modification processing.

Referring to FIG. 14, the CPU 116 accepts font modification indication (step S101). Font modification indication, for example, when a user executes preset and selection of aspect ratio of display font or preset and selection of display mode by operating the input part 118, is generated based on indication from the input part 118. Further, though except for a user's indication, font modification may be required in order to correspond to display contents on the display part 112. For example, when a character data is displayed in a display area, it might be automatically required to modify font by using a character display program. Font modification indication includes lengthwise enlargement ratio and widthwise enlargement ratio.

When font modification indication is generated, the CPU 116 reads original data of target font for display from the font ROM 122, and loads it on the RAM 124 that is memory for work (step S102). Next, the CPU 116 decides whether font modification indication input in step S101 includes widthwise enlargement of the font (step S103). When including widthwise enlargement of the font (step S103; Yes), the CPU 116 firstly enlarges the target font widthwise by executing a widthwise enlargement processing (step S104). Further, when not including widthwise enlargement of the font in step S103 (step S103; No), process proceeds to the next step.

Next, the CPU 116 decides whether font modification indication input in step S101 includes lengthwise enlargement of the font (step S105). When including lengthwise enlargement of the font (step S105; Yes), the CPU 116 firstly enlarges the target font lengthwise by executing a lengthwise enlargement processing (step S106). Further, when not including lengthwise enlargement of the font in step S105 (step S105; No), process proceeds to the next step. Further, column direction enlargement ratio and row direction enlargement ratio are set to the ratio indicated in step S101, and are generally not the same. Doing in this way, when a font enlargement has been finished in the column direction and in the row direction, the CPU 116 temporarily stores the enlarged font data in the font memory 114 as a modification font (step S107), and further displays it on the display part 112 (step S108). As a result, a font is modified, and then displayed on the display part 112.

Next, the widthwise enlargement processing which is executed in the step S104 will be described in detail with reference to the flowchart of FIG. 15. In FIG. 15, first, the CPU 116 divides a target font into a plurality of columns (step S111). Then, the CPU 116 calculates cost for each column that is obtained from division (step S112). In this point, a cost is a value that is calculated from the number of pixels forming a font and whether an adjacent pixel is present or not, and represents a line segment volume in font modification processing by enlargement. That is, it means that higher cost, density of line segment, not point and a set of points, included in the column is higher. Further, cost calculation processing is similar to that of the first embodiment that is described with reference to FIGS. 4 to 6, and thus, description thereof will be omitted.

When cost calculation processing is finished, process returns to the widthwise enlargement processing shown in FIG. 15. The CPU 116 decides whether cost calculation for each column of a target font is finished (step S13), and if not, executes cost calculation for all the columns. When cost calculation for all the columns is finished (step S113; Yes), as shown in FIG. 7(*a*), the CPU 116 put columns in the ascending order of cost (step S114). In FIG. 7(*a*), columns is put in A, B, C, . . . in the ascending order of column cost. Further, when a plurality of columns has the same cost, the plurality of columns are put in the order of closeness to the center of a character to thereby prevent enlargement direction from being unbalanced in the right and left direction. In an example of FIG. 7(*a*), though six columns have cost of '3', they are put in C, D, E, F, G, H, respectively to be distributed to the right and left in the order of closeness to the center. By doing this, order for an enlargement target is put so that balanced enlargement of the right and left from the center of the character may be processed.

When putting each column in the ascending order of cost is finished, the CPU 116 decides the number of columns to be enlarged based on an enlargement ratio that is indicated in step S101 (step S115). This enlargement ratio represents the ratio for enlarging an original data of a bitmap font widthwise by the current font enlargement processing. As described above, when a font enlargement indication is generated in step S101, information about the lengthwise and widthwise enlargement ratio is included in the indication. For example, when a user indicates a lengthwise modification of a character to easily see the character, lengthwise enlargement ratio becomes higher than widthwise enlargement ratio, and when a user indicated a widthwise modification of a character, widthwise enlargement ratio becomes higher than lengthwise enlargement ratio. The enlargement ratio (such as 120%, 150%, etc.) is selected. In addition, irrespective of a user's indication, even though font modification processing is automatically executed by process of the portable terminal device 100, the lengthwise and widthwise enlargement ratio is inevitably decided. Thus, based on the widthwise enlargement ratio, it is decided how many columns should be enlarged in columns of the target font. For example, when the number of columns of enlargement target font is 15 (15 dot) and a widthwise enlargement ratio is set to 120% (1.2 times), the number of columns for widthwise enlargement is 15×1.2=18 (column) to enlarge only three columns. Examples of FIGS. 7(a) and 7(b) correspond to the example of this case.

If the number of columns for widthwise enlargement is decided as described above, the CPU 116 executes an enlargement processing (step S116). That is, in the ascending order of cost, columns are enlarged to a degree of the number of columns for enlargement. In an enlargement of this case, for example, the enlargement is processed by inserting a column having a font pixel pattern equal to that of the column for enlargement into the surroundings of the column for enlargement. In examples of FIGS. 7(a) and 7(b), since the number of columns for enlargement is 3 as described above, for 3 columns in the ascending order of cost ('A', 'B', 'C' columns) shown in FIG. 7(a), columns having the same font formation pixel pattern is inserted. As a result, as shown in FIG. 7(b), three columns are inserted, and an enlarged character having totally 18 columns (18 dots) widthwise can be obtained. In this way, when widthwise enlargement processing is finished, process returns to the main routine shown in FIG. 14.

Next, lengthwise enlargement processing in step S106 of FIG. 14 will be described. Further, a target font for lengthwise enlargement processing becomes the font that is enlarged widthwise. Thus, in examples of FIGS. 7(a) and 7(b), the font having 18 columns (dot) widthwise is processed.

Lengthwise enlargement processing executes process basically equal to widthwise enlargement processing shown in FIG. 15 for each row, not each column. That is, enlargement target font is divided for each row (step S111), cost calculation for each row is executed (step S112), each row is put in the ascending order of cost (step S114), the number of target rows for enlargement is decided based on an lengthwise enlargement ratio (step S115), and enlargement processing for target rows is executed (step S116). Further, in the cost calculation processing shown in FIG. 4, weighting of cost being in consideration of lengthwise adjacent pixels (step S22), weighting being in consideration of space (step S23), and weighting of row having the same cost (step S24) are executed.

As described above, in the font modification processing by enlargement according to the present invention, cost for each row and column is calculated based on the formation of the target font (font formation pixel pattern), and pertinent column and row are enlarged based on the cost. Concretely, row and column close to a line segment are made difficult to be enlarged so as to prevent a portion corresponding to the line segment of a character from being excessively enlarged (step S22). Further, in a character having much space at the end part thereof, an inadequate enlargement of a character due to enlargement of only space is prevented (step S23). Moreover, when row and column having the same pattern are adjacent, they are made to be difficult to be enlarged so as to prevent a specific portion of a character from being excessively enlarged (step S24). Through this process, by considering a pixel pattern forming a character, an enlarged character is maintained balanced to enable natural enlargement.

Figure 16:
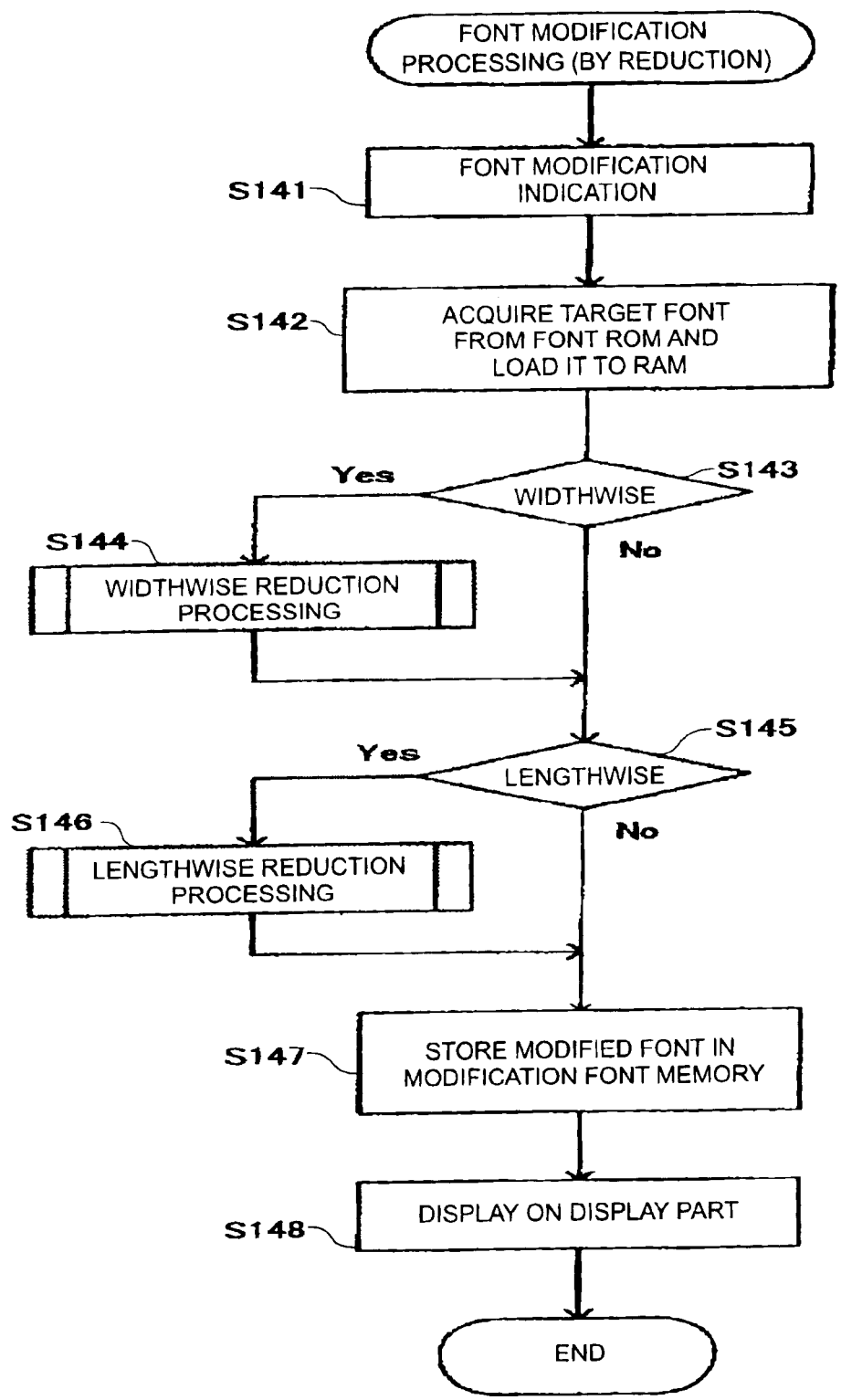
FIG. 16 is a flowchart illustrating an exemplary font modification processing by reduction.

Next, font modification processing by reduction will be described. Font modification processing by reduction is shown in FIG. 16. Font modification processing by reduction is executed, basically, similarly to font modification processing by enlargement. That is, the CPU 116 accepts a font modification indication (step S141), reads the original data of a target font from the font ROM 122, and loads it on the RAM 124 that is a work memory (step S142).

Next, the CPU 116 decides whether font modification indication input in step S141 includes widthwise reduction (step S143), and when including widthwise reduction, the CPU 116 executes a widthwise reduction processing (step S144). Further, the CPU 116 decides whether font modification indication input in step S141 includes lengthwise reduction (step S145), and when including lengthwise reduction, the CPU 116 executes a lengthwise reduction processing (step S146). When a modified font is configured, the CPU 116 stores the modified font in the font memory 114 (step S147), and displays it on the display part 112 (step S148). In this way, font modification processing by reduction is executed.

Figure 17:
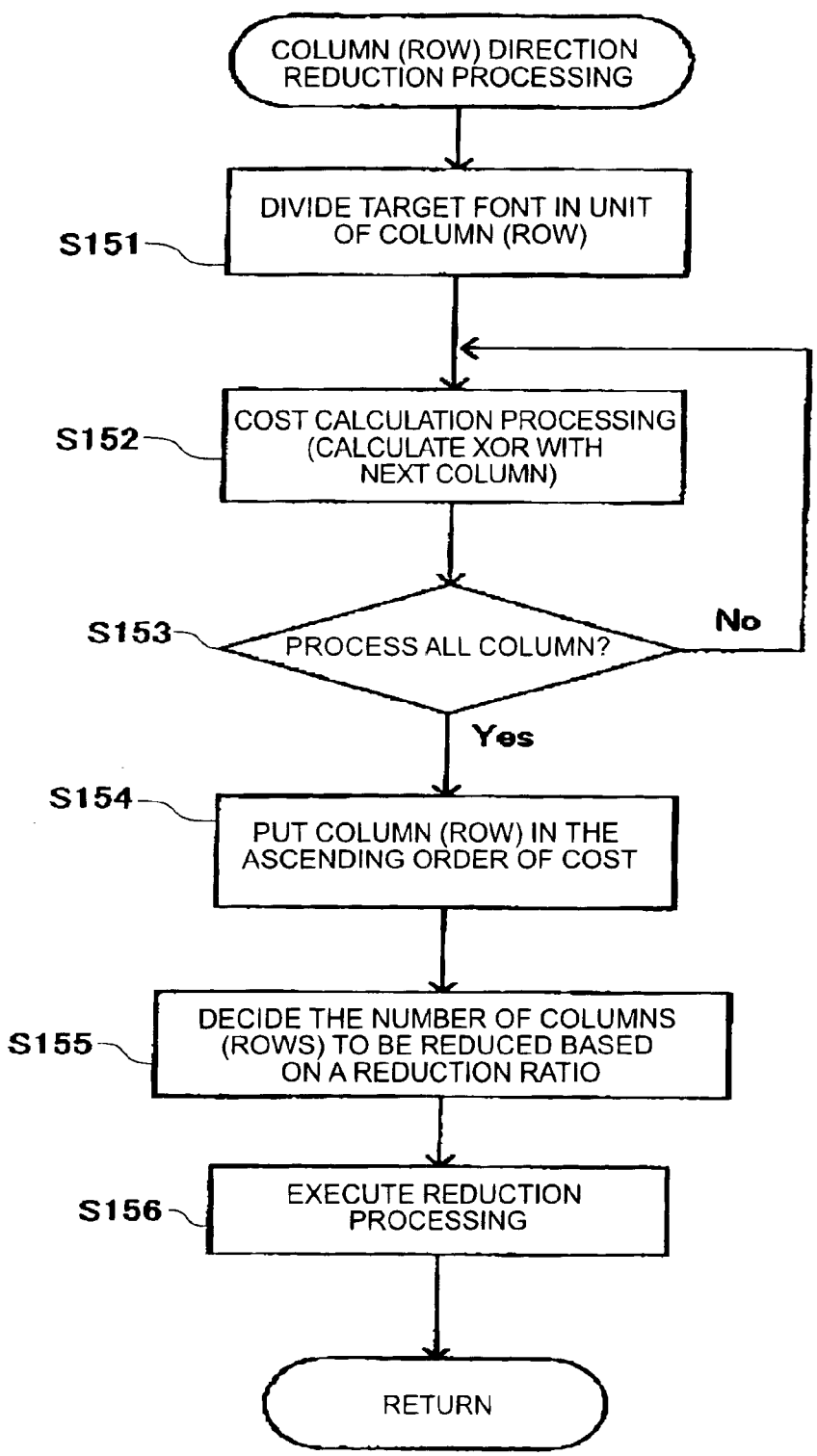
FIG. 17 is a flowchart illustrating an exemplary widthwise (lengthwise) reduction processing.

Next, widthwise reduction processing in a font modification processing by reduction will be described with reference to FIG. 17. FIG. 17 is a flowchart illustrating exemplary widthwise reduction processing. Widthwise reduction processing shown in FIG. 17 is executed in procedure, basically, similarly to font modification processing by enlargement widthwise shown in FIG. 15. That is, the CPU 116 divides a target font in unit of column (step S151), calculates cost for each column (step S152), and when cost for each column is obtained (step S153; Yes), puts each column in the ascending order of cost (step S154). Then, the CPU 116 decides the number of target columns for reduction based on a widthwise reduction ratio (step S155), and executes reduction processing for target columns (step S156).

In this way, widthwise reduction processing in a font modification processing by reduction is basically equal to widthwise enlargement processing in a font modification processing by enlargement. But, in relation to cost calculation method in step S152 and reduction method in step S156, widthwise reduction processing in font modification processing by reduction is not equal to that of font modification processing by enlargement. This point will be described below.

First, cost calculation will be described. Cost in font modification processing by enlargement represents line segment volume, that is, whether pixel included in each column and row is close to a line segment or dot. Meanwhile, cost in font modification processing by reduction represents a degree of likeness, that is, how much each column and row is similar to adjacent column and row, respectively. In particular, the CPU 116 calculates exclusive-OR (XOR) of each column and adjacent column. When adjacent pixel is the same, exclusive-OR becomes '0', but adjacent pixel is not the same, exclusive-OR becomes '1'. Thus, exclusive-OR is calculated for each font formation pixel included in each column, and then, the number of font formation elements having '1' is set as a cost of the column. Accordingly, higher cost, font pixel pattern of the column is not similar to that in an adjacent column, and, lower cost, font pixel pattern of the column is closer to that in an adjacent column. In this way, cost becomes a value that represents a degree of similarity to adjacent column (strictly, a degree of non-similarity).

That is, low-cost of a column means that font pixel pattern of the column is similar to font pixel pattern in an adjacent column. Thus, by making preferentially a column having similar pixel pattern a reduction target, the similar column is deleted. This is based on conception that when adjacent column is similar to the column, though that is preferentially deleted, influence over the total character, that is, incongruity is a little. By this way, natural reduction can be done.

After widthwise reduction processing is finished, though lengthwise reduction processing (step S146) is executed, this process is basically equal to widthwise reduction processing. A target font is divided in unit of row (step S151), cost for each row is calculated (step S152), and when cost is obtained for each row (step S153; Yes), puts each row in the ascending order of cost (step S154). Then, the CPU 116 decides the number of target rows for reduction based on a lengthwise reduction ratio (step S155), and executes reduction processing for target row.

Aspects of row direction reduction processing are shown in FIGS. 10(a) to 10(c). First, as shown in FIG. 10(a), cost calculation for each row is executed, then, rows are put in the ascending order of cost and become targets for reduction in the ascending order of row cost as shown in FIG. 10(b). In reduction processing of step S56, for example, columns are deleted in the ascending order of row cost as shown in FIG. 10(c). In an example of FIG. 10(c), 3 rows (A, B, C) having low-cost are deleted.

As described above, in font modification processing by reduction according to the present invention, a target font is divided in the column and row direction, reduction is executed in consideration of a degree of similarity to each adjacent column and row. Thus, since the portion, which is adjacent to column or row having similar font pixel pattern, is preferentially reduced (deletion of column or row), it is rare that modified font is unnatural.

FIGS. 11(a) and 11(b) illustrate examples of modification font (enlargement example and reduction example) obtained by font modification processing by simple coordinate transformation and by the present invention. In addition, the same enlargement ratio and reduction ratio for widthwise and lengthwise are applied to these examples for convenience of explanation. As apparent from FIGS. 11(a) and 11(b), in modification font obtained by simple coordinate transformation process, stroke of length or width is enlarged to be double (a right lengthwise line of the character '本', a lengthwise line of character '肌'), or slanting line is seen uneven. Further, because of reduction, balance of right and left of a character breaks down (balance of right and left of the character '本'), or pixels are connected to each other to thereby be seen another character (left of the character '肌' is seen '目', not '月'). In this point, font modification processing according to the present invention is capable of obtaining natural modification font without above unfitness.

Above described font modification processing is also executed one character by one character at the time when the character line displayed on the display part 112 is decided. Further, when a user indicates aspect ratio change and so on of a display font, font modification processing for all original data previously prepared in the font ROM 122 is executed, and the result may be stored in the modification font memory 114. In any case, as described above, since font modification processing in itself is executed by simple operation of integer, time for the process is greatly short and there is no case of requiring process time that a user feels unpleasant.

Further, as described above, though font modification is explained by two cases of enlargement and reduction, combination of them can be applicable to generate a modified font. For example, lengthwise font can be generated by lengthwise enlargement and widthwise reduction, and then, widthwise font can be generated by lengthwise reduction and widthwise enlargement. In that case, it is desirable that above described font modification processing by enlargement is applied to the enlargement direction, and font modification processing by reduction is applied to the reduction direction.

In addition, as apparent from FIGS. 14 and 16, modification font is capable of being generated by executing enlargement or reduction in one direction of column and row directions. In that case, process is desirable to be executed only a direction for enlargement or reduction.

Next, order of widthwise enlargement/reduction and lengthwise enlargement/reduction in font modification processing will be described. In previously explained font modification processing, widthwise enlargement/reduction processing is firstly executed, and then, lengthwise enlargement/reduction processing is executed (that is, first widthwise enlarged/reduced, and then, lengthwise enlarged/reduced). However, this is only an example, it is possible to firstly execute lengthwise enlargement/reduction processing, and to execute widthwise enlargement/reduction processing. And, which is desirable depends on formation of the target font to be processed.

Examples are shown in FIGS. 12(a) and 12(b) when a pixel pattern is enlarged in two orders that are not the same. In the example of FIG. 12(a), lengthwise enlargement is firstly executed, and widthwise enlargement is executed. In FIG. 12(a), when horizontal direction cost is calculated for the most left original data 50a, cost of the second column from the top is the smallest. Thus, when the second column from the top is enlarged to a degree of 1 pixel, the center data 50b can be obtained. Next, if vertical direction cost is calculated for the center data 50b, costs of the fourth and fifth columns from the left are smallest. Thus, when one column is enlarged to a degree of 1 pixel, the most right data 50c can be obtained.

Meanwhile, in an example of FIG. 12(b), widthwise enlargement is firstly executed, and lengthwise enlargement is executed. In FIG. 12(b), if vertical direction cost is calculated for the most left original data 60a, cost of the fourth and fifth columns from the left is the smallest. Thus, when one column is enlarged widthwise to a degree of 1 pixel, the center data 60b can be obtained. Next, if horizontal direction cost is calculated for the center data 60b, costs of the first and third columns from the top are the smallest. Thus, when first column from the top is enlarged lengthwise to a degree of 1 pixel, the most right enlarged data 60c can be obtained.

As described above, even though original data are the same, obtained data are resultantly different from each other, which depends on whether enlargement is executed in the order of length→width or width→length. In examples of FIGS. 12(a) and 12(b), as shown in FIG. 12(a), natural enlargement is executed by enlarging the original data in the order of length→width. Thus, in order to execute natural modification for all characters, by experimentally executing modification processing for each character in the order of length→width and in the order of width→length, it is desirable to previously decide which order is pertinent to natural modification. Then, as schematically shown in FIG. 12(c), when font modification processing is executed for original data of each font, it is much desirable to attach processing order information (such as flag, etc.) that represents which order of length e width or width→length is desirable, as an attribute data. If done in this way, the CPU 116 refers to the processing order information attached to the font that is read from font ROM 122 in font modification processing, and is desirable to execute font modification according to the processing order information. Further, even though an equal font, since it might have different desirable processing order for enlargement and reduction, processing order information is desirable to be prepared for modification processing being accompanied with enlargement and modification processing being accompanied with reduction, respectively. Moreover, when desirable processing order depends on enlargement ratio/reduction ratio, processing order information is preferable to be prepared for each enlargement ratio/reduction ratio.

In this embodiment, though enlargement or reduction processing of pixel is executed in the ascending order of cost of columns or row, scope of the present invention is not limited to this embodiment, for example, if an inverse number of the cost used in this embodiment is defined as a new cost, the same effect as this embodiment can be obtained by enlarging and reducing pixel in the descending order of column or row cost.

While this invention has been described in conjunction with specific embodiments thereof, it is evident that many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. A font processing device, comprising:
a data acquiring device that acquires font data of a bitmap font;
a lengthwise analyzing device that analyzes pixel formation of the font data lengthwise;
a widthwise enlargement/reduction device that enlarges or reduces the font data widthwise based on a lengthwise analysis result;
a widthwise analyzing device that analyzes pixel formation of the font data widthwise; and
a lengthwise enlargement/reduction device that enlarges or reduces the font data lengthwise based on a widthwise analysis result.

2. The font processing device according to claim 1, the lengthwise analyzing device further comprising:
a dividing device that divides the font data into a plurality of columns; and
a calculating device that calculates, for each column, a cost that represents pixel formation features, and
the widthwise enlargement/reduction device executing pixel enlargement or reduction for a desired number of columns in the ascending order of column cost.

3. The font processing device according to claim 1, the lengthwise analyzing device further comprising:
a dividing device that divides the font data into a plurality of columns; and
a calculating device that calculates, for each column, a cost that represents pixel formation features, and
the widthwise enlargement/reduction device executing pixel enlargement or reduction for a desired number of columns in the descending order of column cost.

4. The font processing device according to claim 1, the widthwise analyzing device further comprising:
a dividing device that divides the font data into a plurality of rows; and
a calculating device that calculates, for each row, a cost that represents pixel formation features, and
the lengthwise enlargement/reduction device executing pixel enlargement or reduction for a desired number of rows in the ascending order of row cost.

5. The font processing device according to claim 1, the widthwise analyzing device further comprising:
a dividing device that devices the font data into a plurality of rows; and
a calculating device that calculates, for each row, a cost that represents pixel formation features, and
the lengthwise enlargement/reduction device executing pixel enlargement or reduction for a desired number of rows in the descending order of row cost.

6. A font processing device, comprising:
a data acquiring device that acquires font data of a bitmap font;
a widthwise enlargement processing device that enlarges the font data widthwise; and
a lengthwise enlargement processing device that enlarges the font data lengthwise,
the widthwise enlargement processing device further comprising:
a dividing device that divides the font data into a plurality of columns;
a cost calculating device that calculates a cost that represents a line segment volume of a pixel formation, for each column; and
an enlarging device that executes widthwise pixel enlargement for a desired number of columns in the ascending order of column cost, and
the lengthwise enlargement processing device further comprising:
a dividing device that divides the font data into a plurality of rows;
a cost calculating device that calculates a cost that represents a line segment volume of the pixel formation, for each row; and
an enlarging device that executes lengthwise pixel enlargement for a desired number of rows in the ascending order of row cost.

7. A font processing device, comprising:
a data acquiring device that acquires font data of a bitmap font;
a widthwise enlargement processing device that enlarges the font data widthwise; and
a lengthwise enlargement processing device that enlarges the font data lengthwise,
the widthwise enlargement processing device comprises:
a dividing device that divides the font data into a plurality of columns;

a cost calculating device that calculates a cost that represents a line segment volume of a pixel formation, for each column; and an enlarging device that executes widthwise pixel enlargement for a desired number of columns in the descending order of column cost, and the lengthwise enlargement processing device further comprising:

a dividing device that divides the font data into a plurality of rows;

a cost calculating device that calculates a cost that represents a line segment volume of the pixel formation, for each row; and an enlarging device that executes lengthwise pixel enlargement for a desired number of rows in the descending order of row cost.

8. The font processing device according to claim 6, the desired number depends on the number of pixels lengthwise and widthwise, and on an enlargement ratios of the font data.

9. The font processing device according to claim 6, the cost calculating device further comprising:

a calculating device that calculates as the cost the number of pixels forming the column or the row for each column or each row; and an adding device that adds the number of pixels having adjacent pixels in the column or row to the cost.

10. The font processing device according to claim 6, the cost calculating device comprising:

a calculating device that calculates the number of pixels forming the column or the row for each column or each row; and an adding and calculating device that adds the number of pixels having adjacent pixels in the column or row to the number of pixels forming the column or the row, and calculates an inverse number of the added result as the cost.

11. The font processing device according to claim 6, the font data comprising processing order information that represents the order of lengthwise enlargement processing and widthwise enlargement processing to be executed in enlargement processing of the font data, and the font processing device further comprising an order controlling device that controls the execution order of the lengthwise enlargement processing and the widthwise enlargement processing based on the processing order information.

12. A font processing device, comprising:

a data acquiring device that acquires font data of a bitmap font;

a widthwise reduction processing device that reduces the font data widthwise; and a lengthwise reduction processing device that reduces the font data lengthwise, the widthwise reduction processing device further comprising:

a dividing device that divides the font data into a plurality of columns;

a cost calculating device that calculates a cost that represents a degree of likeness to a pixel formation in an adjacent column, for each column; and a reducing device that executes widthwise pixel reduction for a desired number of columns in the ascending order of cost; and the lengthwise reduction processing device further comprising:

a dividing device that divides the font data into a plurality of rows;

a cost calculating device that calculates a cost that represents a likeness to a pixel formation in an adjacent row, for each row; and a reducing device that executes lengthwise pixel reduction for a desired number of rows in the ascending order of row cost.

13. A font processing device, comprising:

a data acquiring device that acquires font data of a bitmap font;

a widthwise reduction processing device that reduces the font data widthwise; and a lengthwise reduction processing device that reduces the font data lengthwise, the widthwise reduction processing device further comprising:

a dividing device for dividing the font data into a plurality of columns;

a cost calculating device for calculating a cost that represents a degree of likeness to a pixel formation of an adjacent column, for each column; and a reducing device that executes widthwise pixel reduction for a desired number of columns in the descending order of column cost; and the lengthwise reduction processing device further comprising:

a dividing device that divides the font data into a plurality of rows;

a cost calculating device that calculates a cost that represents a degree of likeness to a pixel formation in an adjacent row, for each row; and a reducing device that executes lengthwise pixel reduction for a desired number of rows in the descending order of row cost.

14. The font processing device according to claim 12, the desired number depending on the number of pixels lengthwise and widthwise of the font data, and on the reduction ratios of the font data.

15. The font processing device according to claim 12, the cost calculating device calculating the costs based on the exclusive-OR pixel formation of the column or the row for each column and each row and the pixel formation of a column or a row adjacent to said column or said row.

16. The font processing device according to claim 12, the font data comprising processing order information that represents the order of lengthwise reduction processing and widthwise reduction processing to be executed in the reduction processing of the font data, and the font processing device further comprising an order controlling device that controls the execution order of lengthwise reduction processing and widthwise reduction processing based on the processing order information.

17. A terminal device, comprising:

the font processing device according to claim 1;

a memory that stores the font data generated by the font processing device; and a display part that displays the font data generated by the font processing device.

18. A method of processing a font, comprising:

acquiring font data of a bitmap font;

analyzing pixel formation of the font data lengthwise;

enlarging/reducing the font data widthwise based on a lengthwise analysis result;

analyzing the pixel formation of the font data widthwise; and enlarging or reducing the font data lengthwise based on a widthwise analysis result.

19. A method of processing a font, comprising:

acquiring font data of a bitmap font;

enlarging the font data widthwise; and enlarging the font data lengthwise, the step of enlarging the font data widthwise further comprising:
- dividing the font data into a plurality of columns;
- calculating a cost that represents a line segment volume of a pixel formation, for each column; and
- executing widthwise pixel enlargement for a desired number of columns in the ascending order of column cost; and the step of enlarging the font data lengthwise further comprising:
- dividing the font data into a plurality of rows;
- calculating a cost that represents a line segment volume of the pixel formation, for each row; and
- executing lengthwise pixel enlargement for a desired number of rows in the ascending order of row cost.

20. A method of processing a font, comprising:

acquiring font data of a bitmap font;

enlarging the font data widthwise; and enlarging the font data lengthwise, the step of enlarging the font data widthwise comprising:
- dividing the font data into a plurality of columns;
- calculating a cost that represents a line segment volume of a pixel formation, for each column; and
- executing widthwise pixel enlargement for a desired number of columns in the descending order of column cost;

the step of enlarging the font data lengthwise comprising:
- dividing the font data into a plurality of rows;
- calculating a cost that represents a line segment volume of the pixel formation, for each row; and
- executing lengthwise pixel enlargement for a desired number of rows in the descending order of row cost.

21. A method of processing a font, comprising:

acquiring font data of a bitmap font;

reducing the font data widthwise; and reducing the font data lengthwise, the step of reducing the font data widthwise comprising:
- dividing the font data into a plurality of columns;
- calculating a cost that represents a degree of likeness to a pixel formation in an adjacent column, for each column; and
- executing widthwise pixel reduction for a desired number of columns in the ascending order of column cost;

the step of reducing the font data lengthwise comprising:
- dividing the font data into a plurality of rows;
- calculating a cost that represents a degree of likeness to a pixel formation in an adjacent row, for each row; and
- executing lengthwise pixel reduction for a desired number of rows in the ascending order of row cost.

22. A method of processing a font, comprising:

acquiring font data of a bitmap font;

reducing the font data widthwise; and reducing the font data lengthwise, the step of reducing the font data widthwise comprising:
- dividing the font data into a plurality of columns;
- calculating a cost that represents a degree of likeness to a pixel formation in an adjacent column, for each column; and
- executing widthwise pixel reduction for a desired number of columns in the descending order of column cost; and the step of reducing the font data lengthwise comprising:
- dividing the font data into a plurality of rows;
- calculating a cost that represents a degree of likeness to a pixel formation in an adjacent row, for each row; and
- executing lengthwise pixel reduction for a desired number of rows in the descending order of row cost.

23. A font processing program to be executed in a terminal device having a computer, the font processing program making the computer function as:
- a data acquiring device that acquires font data of a bitmap font;
- a lengthwise analyzing device that analyzes the pixel formation of the font data lengthwise;
- a widthwise enlargement/reduction device that enlarges or reduces the font data widthwise based on the lengthwise analysis result;
- a widthwise analyzing device that analyzes the pixel formation of the font data widthwise; and
- a lengthwise enlargement/reduction device that enlarges or reduces the font data lengthwise based on the widthwise analysis result.

24. A font processing program to be executed in a terminal device having a computer, the font processing program making the computer function as:
- a data acquiring device that acquires font data of a bitmap font;
- a widthwise enlargement processing device that enlarges the font data widthwise; and
- a lengthwise enlargement processing device that enlarges the font data lengthwise, the widthwise enlargement processing device comprising:
- dividing device that divides the font data into a plurality of columns;
- cost calculating device that calculates a cost that represents a line segment volume of a pixel formation, for each column; and
- enlarging device that executes widthwise pixel enlargement for a desired number of columns in the ascending order of column cost; and the lengthwise enlargement processing device comprising:
- dividing device that divides the font data into a plurality of rows;
- cost calculating device that calculates a cost that represents a line segment volume of a pixel formation, for each row; and
- enlarging device that executes lengthwise pixel enlargement for a desired number of rows in the ascending order of row cost.

25. A font processing program to be executed in a terminal device having a computer, the font processing program making the computer function as:
- a data acquiring device that acquires font data of a bitmap font;
- a widthwise enlargement processing device that enlarges the font data widthwise; and
- a lengthwise enlargement processing device that enlarges the font data lengthwise, the widthwise enlargement processing device further comprising:
  a dividing device that divides the font data into a plurality of columns;
  a cost calculating device that calculates a cost that represents a line segment volume of a pixel formation, for each column; and
  a enlarging device that executes widthwise pixel enlargement for a desired number of columns in the descending order of column cost; and
the lengthwise enlargement processing device further comprising:
  a dividing device that divides the font data into a plurality of rows;
  a cost calculating device that calculates a cost that represents a line segment volume of a pixel formation, for each row; and
  a enlarging device that executes lengthwise pixel enlargement for a desired number of rows in the descending order of row cost.

26. A font processing program to be executed in a terminal device having a computer, the font processing program making the computer function as:
  a data acquiring device that acquires font data of a bitmap font;
  a widthwise reduction processing device that reduces the font data widthwise; and
  a lengthwise reduction processing device that reduces the font data lengthwise,
  the widthwise reduction processing device comprising:
    a dividing device that divides the font data into a plurality of columns;
    a cost calculating device that calculates a cost that represents a degree of likeness to a pixel formation in an adjacent column, for each column; and
    a reducing device that executes widthwise pixel reduction for a desired number of columns in the ascending order of column cost; and
  the lengthwise reduction processing device further comprising:
    a dividing device that divides the font data into a plurality of rows;
    a cost calculating device that calculates a cost that represents a degree of likeness to a pixel formation in an adjacent row, for each row; and
    a reducing device that executes lengthwise pixel reduction for a desired number of rows in the ascending order of row cost.

27. A font processing program to be executed in a terminal device having a computer, the font processing program making the computer function as:
  a data acquiring device that acquires font data of a bitmap font;
  a widthwise reduction processing device that reduces the font data widthwise; and
  a lengthwise reduction processing device that reduces the font data lengthwise,
  the widthwise reduction processing device further comprising:
    a dividing device that divides the font data into a plurality of columns;
    a cost calculating device that calculates a cost that represents a degree of likeness to a pixel formation in an adjacent column, for each column; and
    a reducing device that executes widthwise pixel reduction for a desired number of columns in the descending order of column cost; and
  the lengthwise reduction processing device further comprising:
    a dividing device that divides the font data into a plurality of rows;
    a cost calculating device that calculates a cost that represents a degree of likeness to a pixel formation in an adjacent row, for each row; and
    a reducing device that executes lengthwise pixel reduction for a desired number of rows in the descending order of row cost.

28. A font processing device, comprising:
  a receiving device that receives a font modification indication;
  an acquiring device that acquires font data of a bitmap font;
  a widthwise modifying device that, when the font modification indication includes widthwise font modification, analyzes the pixel formation of the font data lengthwise and enlarging or reducing the font data widthwise based on the lengthwise analysis result; and
  a lengthwise modifying device that, when the font modification indication includes lengthwise font modification, analyzes the pixel formation of the font data widthwise and enlarging or reducing the font data lengthwise based on the widthwise analysis result.

29. The font processing device according to claim 28, the widthwise modifying device further comprising:
  a dividing device that divides the font data into a plurality of columns;
  a calculating device that calculates a cost that represents pixel formation features, for each column; and
  an executing device that executes pixel enlargement or reduction processing for a desired number of columns in the ascending order of column cost.

30. The font processing device according to claim 28, the widthwise modifying device further comprising:
  a dividing device that divides the font data into a plurality of columns;
  a calculating device that calculates a cost that represents pixel formation features, for each column; and
  an executing device that executes pixel enlargement or reduction processing for a desired number of columns in the descending order of column cost.

31. The font processing device according to claim 28, the lengthwise modifying device further comprising:
  a dividing device that divides the font data into a plurality of rows;
  a calculating device that calculates a cost that represents pixel formation features, for each row; and
  an executing device that executes pixel enlargement or reduction processing for a desired number of rows in the ascending order of row cost.

32. The font processing device according to claim 28, the lengthwise modifying device further comprising:
  a dividing device that divides the font data into a plurality of rows;
  a calculating device that calculates a cost that represents pixel formation features, for each row; and
  an executing device that executes pixel enlargement or reduction processing for a desired number of rows in the descending order of row cost.

33. A font processing device, comprising:
  a receiving device that receives a font modification indication including lengthwise and widthwise modification ratios;

a data acquiring device that acquires font data of a bitmap font;

a widthwise modifying device that processes widthwise modification of the font data in accordance with the widthwise modification ratio; and a lengthwise modifying device that processes lengthwise modification of the font data in accordance with the lengthwise modification ratio, the widthwise modifying device further comprising:
  a dividing device that divides the font data into a plurality of columns;
  a first cost calculating device that calculates a cost that represents pixel formation features, for each of the plurality of columns; and
  a widthwise enlarging or reducing device that enlarges or reduces a first desired number of columns widthwise in the ascending order of column cost; and the lengthwise modifying device further comprising:
  a dividing device that divides the font data into a plurality of rows;
  a second cost calculating device that calculates a cost that represents pixel formation features, for each of the plurality of rows; and
  a lengthwise enlarging or reducing device that enlarges or reduces a second desired number of rows lengthwise in the ascending order of row cost.

34. A font processing device, comprising:

a receiving device that receives a font modification indication including lengthwise and widthwise modification ratios;

a data acquiring device that acquires font data of a bitmap font;

a widthwise modifying device that processes widthwise modification of the font data in accordance with the widthwise modification ratio; and a lengthwise modifying device that processes lengthwise modification of the font data in accordance with the lengthwise modification ratio, the widthwise modifying device further comprising:
  a dividing device that divides the font data into a plurality of columns;
  a first cost calculating device that calculates a cost that represents pixel formation features, for each of the plurality of columns; and
  a widthwise enlarging or reducing device that enlarges or reduces a first desired number of columns widthwise in the descending order of column cost; and the lengthwise modifying device further comprising:
  a dividing device that divides the font data into a plurality of rows;
  a second cost calculating device that calculates a cost that represents pixel formation features, for each of the plurality of rows; and
  a lengthwise enlarging or reducing device that enlarges or reduces a second desired number of rows lengthwise in the descending order of row cost.

35. The font processing device according to claim 33, the first desired number depending on the number of lengthwise and widthwise pixels of the font data and on the widthwise modification ratio, and the second desired number depending on the number of lengthwise and widthwise pixels of the font data and on the lengthwise modification ratio.

36. The font processing device according to claim 33, the cost calculating device calculating a cost that represents a line segment volume of the pixel formation for each of the plurality of columns or rows when the modification processing is an enlargement processing, and calculating a cost that represents a degree of likeness between the pixel formation in the current column or row and the pixel formation in an adjacent column or row, for each of the plurality of columns or rows, when the modification processing is a reduction processing.

37. The font processing device according to claim 36, the cost calculating device, when calculating a cost representing the line segment volume, calculating as the cost the number of pixels forming the column or the row for each column or each row, and further adding the number of pixels in the column or row having adjacent pixels to the cost.

38. The font processing device according to claim 36, the cost calculating device, when calculating a cost representing the line segment volume, calculating the number of pixels forming the column or the row for each column or each row, and further adding the number of pixels having adjacent pixels in the column or the row to the number of pixels forming the column or the row, and calculates an inverse number of the added result as a cost.

39. The font processing device according to claim 36, the cost calculating device, when calculating a cost representing the degree of likeness, calculating the cost based on the exclusive-OR of the pixel formation of the column or the row for each column and each row and the pixel formation of a column or a row adjacent to said column or said row.

40. The font processing device according to claim 33, the font data comprising processing order information that represents the order of the lengthwise modification processing and the widthwise modification processing to be executed in the modification processing of the font data, and the font processing device further comprising a order controlling device that controls the execution order of the lengthwise modification processing and the widthwise modification processing based on the processing order information.

41. A terminal device, comprising:
  the font processing device according to claim 28;
  a memory that stores the font data generated by the font processing device; and
  a display part that displays the font data generated by the font processing device.

42. A method of processing a font, comprising:

receiving a font modification indication;

acquiring font data of a bitmap font;

widthwise modifying, when the font modification indication includes widthwise font modification, of analyzing the pixel formation of the font data lengthwise and enlarging or reducing the font data widthwise based on the lengthwise analysis result; and lengthwise modifying, when the font modification indication includes widthwise font modification, of analyzing the pixel formation of the font data widthwise and enlarging or reducing the font data lengthwise based on the widthwise analysis result.

43. A method of processing a font, comprising:

receiving a font modification indication including lengthwise and widthwise modification ratios;

acquiring font data of a bitmap font;

processing widthwise modification of the font data in accordance with the widthwise modification ratio; and processing lengthwise modification of the font data in accordance with the lengthwise modification ratio, the step of processing widthwise modification of the font data further comprising:

dividing the font data into a plurality of columns;
calculating a first cost that represents pixel formation features, for each of the plurality of columns; and
firstly enlarging or reducing a first desired number of columns widthwise in the ascending order of column cost; and the step of processing lengthwise modification of the font data further comprising:
dividing the font data into a plurality of rows;
calculating a second cost that represents pixel formation features, for each of the plurality of rows; and
secondly enlarging or reducing a second desired number of rows lengthwise in the ascending order of row cost.

44. A method of processing a font, comprising:
receiving a font modification indication including lengthwise and widthwise modification ratio;
acquiring font data of a bitmap font;
processing widthwise modification of the font data in accordance with the widthwise modification ratio; and
processing lengthwise modification of the font data in accordance with the lengthwise modification ratio,
the step of processing widthwise modification of the font data comprising:
dividing the font data into a plurality of columns;
calculating a first cost that represents pixel formation features, for each of the plurality of columns; and
firstly enlarging or reducing a first desired number of columns widthwise in the descending order of column cost; and
the step of processing lengthwise modification of the font data comprising:
dividing the font data into a plurality of rows;
calculating a second cost that represents pixel formation features, for each of the plurality of rows; and
secondly enlarging or reducing a second desired number of rows lengthwise in the descending order of row cost.

45. A font processing program to be executed in a terminal device having a computer, wherein the font processing program making the computer function as:
a receiving device that receives a font modification indication;
an acquiring device that acquires font data of a bitmap font;
a widthwise modifying device that, when the font modification indication include widthwise font modification, analyzes the pixel formation of the font data lengthwise and enlarging or reducing the font data widthwise based on a lengthwise analysis result; and
a lengthwise modifying device that, when the font modification indication include widthwise font modification, analyzes the pixel formation of the font data widthwise and enlarging or reducing the font data lengthwise based on a widthwise analysis result.

46. A font processing program to be executed in a terminal device having a computer, wherein the font processing program making the computer function as:
a receiving device that receives a font modification indication including lengthwise and widthwise modification ratios;
a data acquiring device that acquires font data of a bitmap font;
a widthwise modifying device that processes widthwise modification of the font data in accordance with the widthwise modification ratio; and
a lengthwise modifying device that processes lengthwise modification of the font data in accordance with the lengthwise modification ratio,
the widthwise modifying device further comprising:
a dividing device that divides the font data into a plurality of columns;
a first cost calculating device that calculates a cost that represents pixel formation features, for each of the plurality of columns; and
a widthwise enlarging or reducing device that enlarges or reduces a first desired number of columns widthwise in the ascending order of column cost; and
a the lengthwise modifying device further comprising:
a dividing device that divides the font data into a plurality of rows;
a second cost calculating device that calculates a cost that represents pixel formation features, for each of the plurality of rows; and
a lengthwise enlarging or reducing device that enlarges or reduces a second desired number of rows lengthwise in the ascending order of row cost.

47. A font processing program to be executed in a terminal device having a computer, wherein the font processing program making the computer function as:
a receiving device that receives a font modification indication including lengthwise and widthwise modification ratios;
a data acquiring device that acquires font data of a bitmap font;
a widthwise modifying device that processes widthwise modification of the font data in accordance with the widthwise modification ratio; and
a lengthwise modifying device that processes lengthwise modification of the font data in accordance with the lengthwise modification ratio,
the widthwise modifying device further comprising:
a dividing device that divides the font data into a plurality of columns;
a first cost calculating device that calculates a cost that represents pixel formation features, for each of the plurality of columns; and
a widthwise enlarging or reducing device that enlarges or reduces a first desired number of columns widthwise in the descending order of column cost; and
the lengthwise modifying device further comprising:
a dividing device that divides the font data into a plurality of rows;
a second cost calculating device that calculates a cost that represents pixel formation features, for each of the plurality of rows; and
a lengthwise enlarging or reducing device that enlarges or reduces a second desired number of rows lengthwise in the descending order of row cost.

* * * * *